US012586273B2

(12) United States Patent (10) Patent No.: US 12,586,273 B2
Jacobson et al. (45) Date of Patent: Mar. 24, 2026

(54) LOSSLESS REMOVAL OF REDUNDANT CONTROL POINTS OR SEGMENTS

(71) Applicant: Adobe Inc., San Jose, CA (US)

(72) Inventors: Alec Stefan Jacobson, Toronto (CA); Siqi Wang, Jersey City, NJ (US)

(73) Assignee: Adobe Inc., San Jose, CA (US)

( * ) Notice: Subject to any disclaimer, the term of this patent is extended or adjusted under 35 U.S.C. 154(b) by 154 days.

(21) Appl. No.: 18/535,992

(22) Filed: Dec. 11, 2023

(65) Prior Publication Data

US 2025/0191261 A1 Jun. 12, 2025

(51) Int. Cl.
| | |
|---|---|
| *G09G 5/00* | (2006.01) |
| *G06T 7/73* | (2017.01) |
| *G06T 11/20* | (2006.01) |
| *G06T 11/60* | (2006.01) |

(52) U.S. Cl.
CPC .............. *G06T 11/60* (2013.01); *G06T 7/73* (2017.01); *G06T 11/203* (2013.01)

(58) Field of Classification Search
CPC .......... G06T 11/60; G06T 7/73; G06T 11/203
USPC ........................................................ 345/672
See application file for complete search history.

(56) References Cited

U.S. PATENT DOCUMENTS

| | | | | |
|---|---|---|---|---|
| 2009/0144331 A1* | 6/2009 | Witmer | ............. | G01C 21/3819 |
| 2015/0339525 A1* | 11/2015 | Marcelli | ............. | G06V 30/226 |
| | | | | 382/161 |
| 2020/0098087 A1* | 3/2020 | Peterson | ............. | G06F 3/04812 |

OTHER PUBLICATIONS

Agarwal et al., "Ceres Solver", Available online at: <https://github.com/ceres-solver/ceres-solver>, Oct. 2023, 2 pages.
Agarwal, P. K., "Lecture 23: Hausdorff and Frechet distance", CPS296.2 Geometric Optimization, Apr. 5, 2007, 6 pages.
Alexa et al., "Representing Animations by Principal Components", Computer Graphics Forum, vol. 19, No. 3, Sep. 2000, pp. 411-418.
Boor et al., "High Accuracy Geometric Hermite Interpolation", Computer Aided Geometric Design, vol. 4, No. 4, Dec. 1987, pp. 269-278.
Boyd et al., "Convex Optimization", Cambridge University Press, 2004, 714 pages.
Boyd et al., "Convex Optimization", Solutions Manual, Available online at: <https://egrcc.github.io/docs/math/cvxbook-solutions.pdf>, Jan. 2006, 302 pages.
Chang et al., "Vectorization of Hand-drawn Image Using Piecewise Cubic Bézier Curves Fitting", Pattern Recognition, vol. 31, No. 11, Nov. 1998, pp. 1747-1755.
Dalstein et al., "Vector Graphics Animation with Time-varying Topology", ACM Transactions on Graphics, vol. 34, No. 4, Jul. 27, 2015, 12 pages.

(Continued)

*Primary Examiner* — Gordon G Liu

(74) *Attorney, Agent, or Firm* — Shook, Hardy & Bacon L.L.P.

(57) ABSTRACT

Various disclosed embodiments are directed to the lossless removal of redundant control points and/or segments based on chain-to-chain and/or segment-to-segment distance computations. Additionally or alternatively, such removal may be based on identifying all possible lossless removal operations to ensure that the smallest possible zero-error (or near zero-error) representation of a given image. Subsequent lossy operations may be computed via local Gauss-Newton optimization and processing a priority queue.

20 Claims, 10 Drawing Sheets

(56) References Cited

OTHER PUBLICATIONS

Dierckx, P., "Curve and Surface Fitting with Splines", Oxford Science Publications, 1995, 5 pages.

Douglas et al., "Algorithms for the Reduction of the Number of Points Required to Represent a Digitized Line or Its Caricature", Cartographica: The International Journal for Geographic Information and Geovisualization, vol. 10, No. 2, Dec. 1973, pp. 112-122.

Dung et al., "A Direct Method to Solve Optimal Knots of B-spline Curves: An Application for Non-uniform B-spline Curves Fitting", PLoS ONE, vol. 12, No. 3, Mar. 20, 2017, 24 pages.

Garland et al., "Surface Simplification Using Quadric Error Metrics", SIGGRAPH '97: Proceedings of the 24th annual conference on Computer graphics and interactive techniques, Aug. 3, 1997, 8 pages.

Goethem et al., "Topologically Safe Curved Schematisation", The Cartographic Journal, vol. 50, No. 3, Aug. 2013, pp. 276-285.

Hoppe, H., "Progressive Meshes", SIGGRAPH '96: Proceedings of the 23rd Annual Conference on Computer Graphics and Interactive Techniques, Aug. 1, 1996, pp. 99-108.

Hu et al., "TriWild: Robust Triangulation with Curve Constraints", ACM Transactions on Graphics, vol. 38, No. 4, Jul. 12, 2019, pp. 1-15.

Jacobson et al., "gptoolbox: Geometry Processing Toolbox", Available online at: <http://github.com/alecjacobson/gptoolbox>, 2021, 6 pages.

Jupp, D. L. B., "Approximation to Data by Splines with Free Knots", SIAM Journal on Numerical Analysis, vol. 15, No. 2, Apr. 1978, pp. 328-343.

Kang et al., "Knot Calculation for Spline Fitting via Sparse Optimization", Computer-Aided Design, vol. 58, Jan. 2015, pp. 179-188.

Karis, B., "The Journey to Nanite", HPG 2022 Keynote, Available online at: <https://www.highperformancegraphics.org/slides22/Journey_to_Nanite.pdf>, 2022, 148 pages.

Karni et al., "Compression of Soft-body Animation Sequences", Computers & Graphics, vol. 28, No. 1, Feb. 2004, pp. 25-34.

Kolesnikov, A., "Approximation of Digitized Curves with Cubic Bezier Splines", Proceedings of 2010 IEEE 17th International Conference on Image Processing, Sep. 2010, pp. 4285-4288.

Lengyel, J. E., "Compression of Time-Dependent Geometry", I3D '99: Proceedings of the 1999 Symposium on Interactive 3D Graphics, Apr. 1999, pp. 89-95.

Levien, R. L., "From Spiral to Spline: Optimal Techniques in Interactive Curve Design", Electrical Engineering and Computer Sciences, University of California, 2009, 193 pages.

Liu et al., "Skinning Cubic Bézier Splines and Catmull-Clark Subdivision Surfaces", ACM Transactions on Graphics, vol. 33, No. 6, 2014, 9 pages.

Loach et al., "On the Best Least Squares Approximation of Continuous Functions using Linear Splines with Free Knots", IMA Journal of Numerical Analysis, vol. 11, No. 3, 1991, pp. 393-409.

Lyche et al., "Knot Removal for Parametric B-spline Curves and Surfaces", Computer Aided Geometric Design, vol. 4, No. 3, Nov. 1987, pp. 217-230.

Lyness et al., "Numerical Differentiation of Analytic Functions", SIAM Journal on Numerical Analysis, vol. 4, No. 2, 1967, pp. 202-210.

Masood et al., "Capturing Outlines of 2D Objects with Bezier Cubic Approximation", Image and Vision Computing, vol. 27, No. 6, May 2009, pp. 704-712.

Mokhtarian et al., "Automatic Fitting of Digitised Contours at Multiple Scales Through the Curvature Scale Space Technique", Computers & Graphics, vol. 29, No. 6, Dec. 2005, pp. 961-971.

Penner, A., "Fitting a Cubic Bezier to a Parametric Function", The College Mathematics Journal, vol. 50, No. 3, May 2019, pp. 185-196.

Rote, G., "Computing the Frechet Distance Between Piecewise Smooth Curves", Computational Geometry, vol. 37, No. 3, Aug. 2007, pp. 162-174.

Sarfraz et al., "An Algorithm for Automatic Capturing of the Font Outlines", Computers & Graphics, vol. 26, No. 5, Oct. 2002, pp. 795-804.

Sarfraz et al., "Capturing Outlines of Planar Images Using Bézier Cubics", Computers and Graphics, vol. 31, No. 5, Oct. 2007, pp. 719-729.

Sattler et al., "Simple and Efficient Compression of Animation Sequences", SCA '05: Proceedings of the 2005 ACM SIGGRAPH/Eurographics symposium on Computer animation, Jul. 2005, pp. 209-217.

Schneider, P.J., "An Algorithm for Automatically Fitting Digitized Curves", Graphics Gems, Aug. 1990, pp. 612-626.

Shao et al., "Curve Fitting with Bezier Cubics", Graphical Models and Image Processing, vol. 58, No. 3, May 1996, pp. 223-232.

Váš et al., "COBRA: Compression of the Basis for PCA Represented Animations", Computer Graphics Forum, vol. 28, Sep. 2009, pp. 1529-1540.

Zhang et al., "Complementary Dynamics", ACM Transactions on Graphics, vol. 39, No. 6, Dec. 2020, pp. 1-11.

* cited by examiner

700

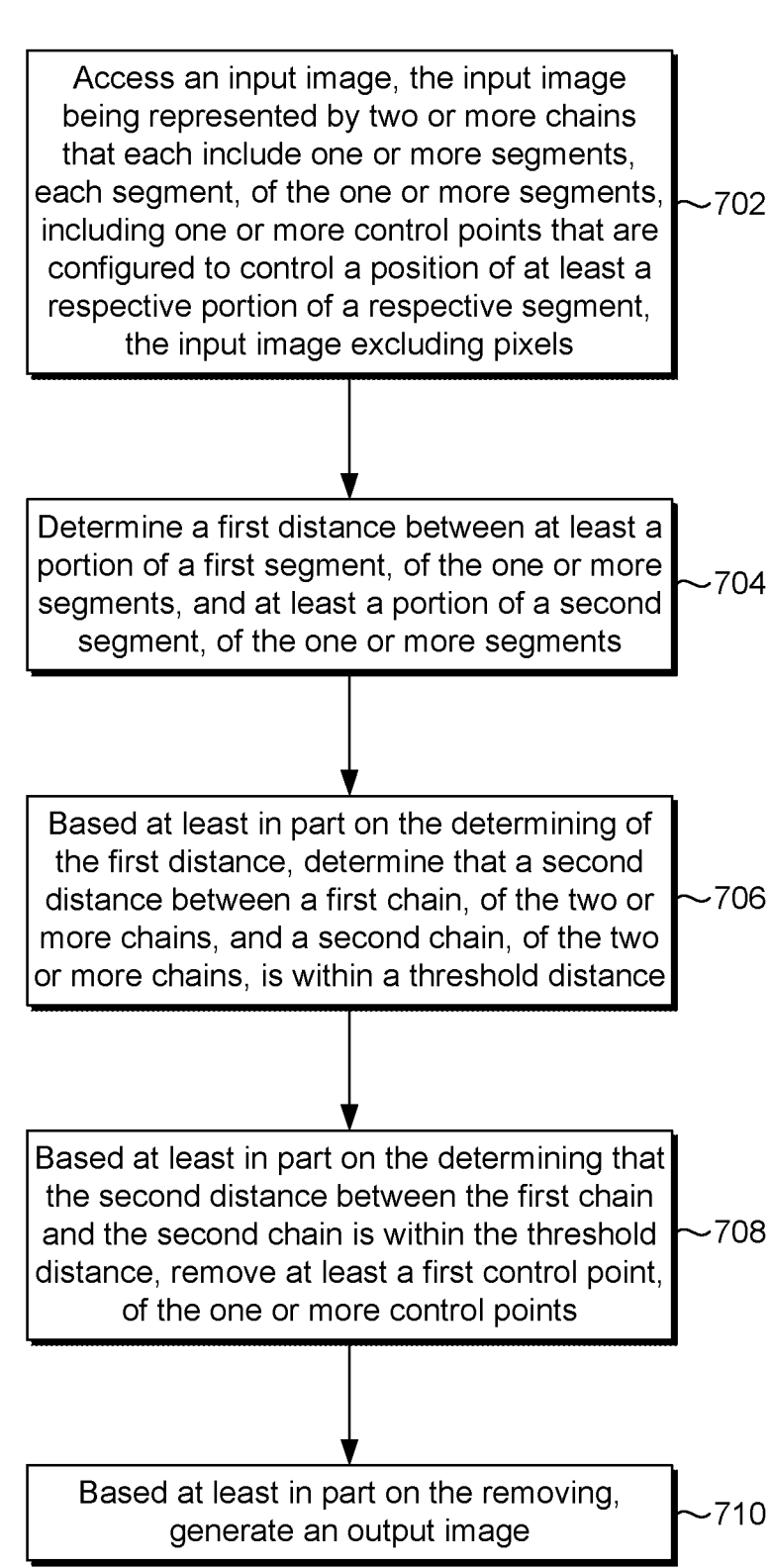

Access an input image, the input image being represented by two or more chains that each include one or more segments, each segment, of the one or more segments, including one or more control points that are configured to control a position of at least a respective portion of a respective segment, the input image excluding pixels ~702

Determine a first distance between at least a portion of a first segment, of the one or more segments, and at least a portion of a second segment, of the one or more segments ~704

Based at least in part on the determining of the first distance, determine that a second distance between a first chain, of the two or more chains, and a second chain, of the two or more chains, is within a threshold distance ~706

Based at least in part on the determining that the second distance between the first chain and the second chain is within the threshold distance, remove at least a first control point, of the one or more control points ~708

Based at least in part on the removing, generate an output image ~710

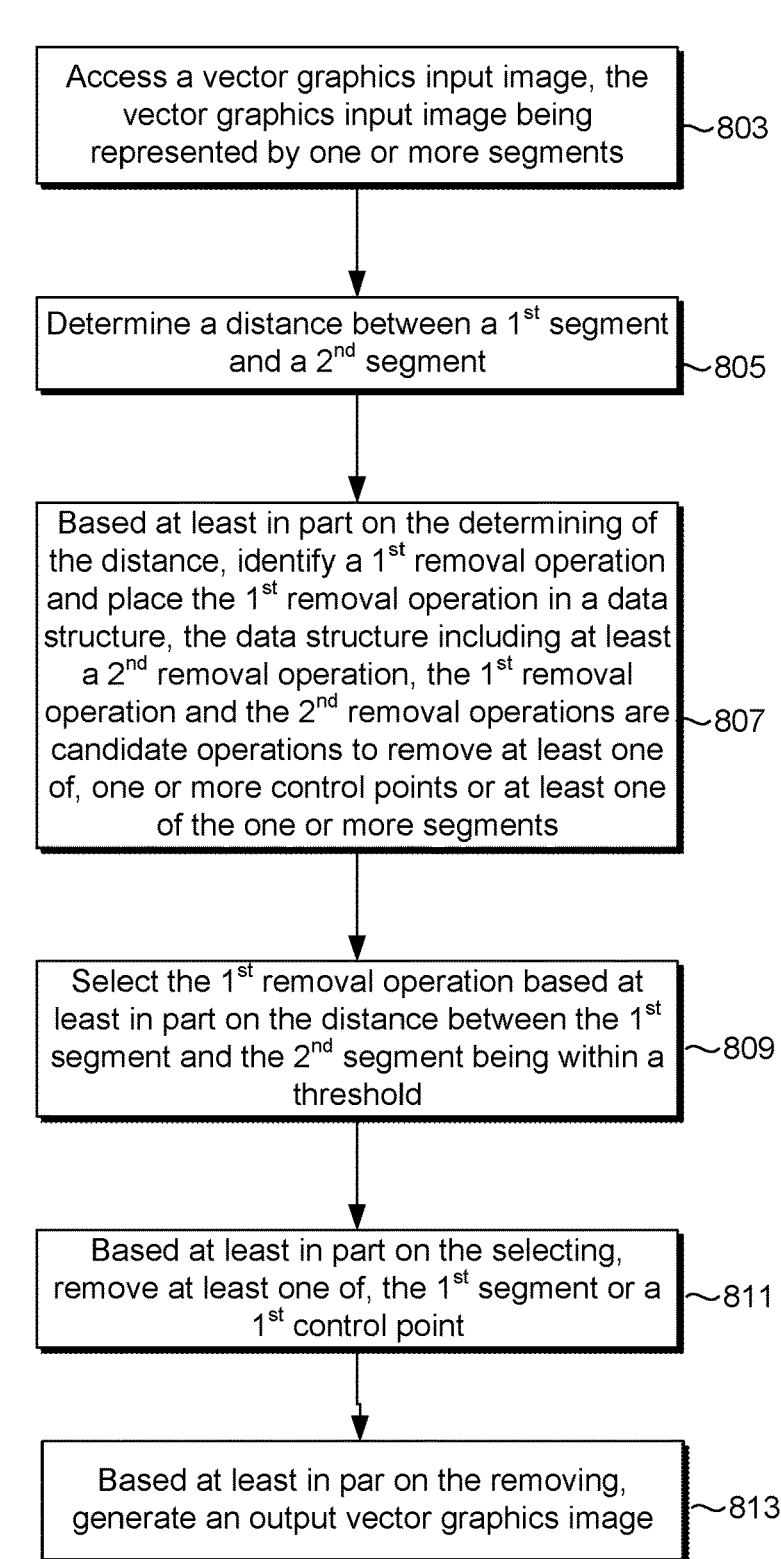

Access a vector graphics input image, the vector graphics input image being represented by one or more segments ∼803

Determine a distance between a 1st segment and a 2nd segment ∼805

Based at least in part on the determining of the distance, identify a 1st removal operation and place the 1st removal operation in a data structure, the data structure including at least a 2nd removal operation, the 1st removal operation and the 2nd removal operations are candidate operations to remove at least one of, one or more control points or at least one of the one or more segments ∼807

Select the 1st removal operation based at least in part on the distance between the 1st segment and the 2nd segment being within a threshold ∼809

Based at least in part on the selecting, remove at least one of, the 1st segment or a 1st control point ∼811

Based at least in par on the removing, generate an output vector graphics image ∼813

LOSSLESS REMOVAL OF REDUNDANT CONTROL POINTS OR SEGMENTS

BACKGROUND

A vector graphics image is a type of digital image that is created and represented using geometric shapes, lines, paths, points, and/or curves (referred to as "vector objects,") rather than a grid of individual pixels, as seen in raster graphics images. Vector graphics use mathematical equations to define these vector objects and their attributes, making them resolution-independent. This means that vector graphics can be scaled up or down without any loss of image quality or detail (unlike raster graphics images), making them particularly useful for designs that need to be versatile in size or for producing sharp and crisp graphics.

Various technical challenges revolve around vector graphics often becoming overly complex, especially when they are created using intricate details or when they are imported from other sources. For example, a vector graphics image may include too many curves (e.g., Bézier curves), the curves are too detailed, and/or there are too many control points. Control points refer to specific points or nodes that are used to define and manipulate the shape of curves or other vector objects.

SUMMARY

One or more embodiments are directed to the lossless removal of redundant control points and/or segments (e.g., Bézier curves) based on chain-to-chain and/or segment-to-segment distance computations. Additionally or alternatively, such removal may be based on identifying all possible lossless removal operations to ensure that the smallest possible zero-error (or near zero-error) representation of a given image. Subsequent lossy operations may be computed via local Gauss-Newton optimization and processing a priority queue.

Various embodiments of the present disclosure have various technical effects in light of various technical solutions that overcome one or more of the problems described herein. For example, such technical effects include, among others, a significant reduction in memory consumption and file size, less computational power to render, improved bandwidth, improved user experience, and improved removal accuracy, as described in more detail below.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 7 is a flow diagram of an example process for generating an output image based on control point removal, according to some embodiments.

FIG. 8 is a flow diagram of an example process for generating an output vector graphics image, according to some embodiments.

DETAILED DESCRIPTION

Overview

Figure 1:
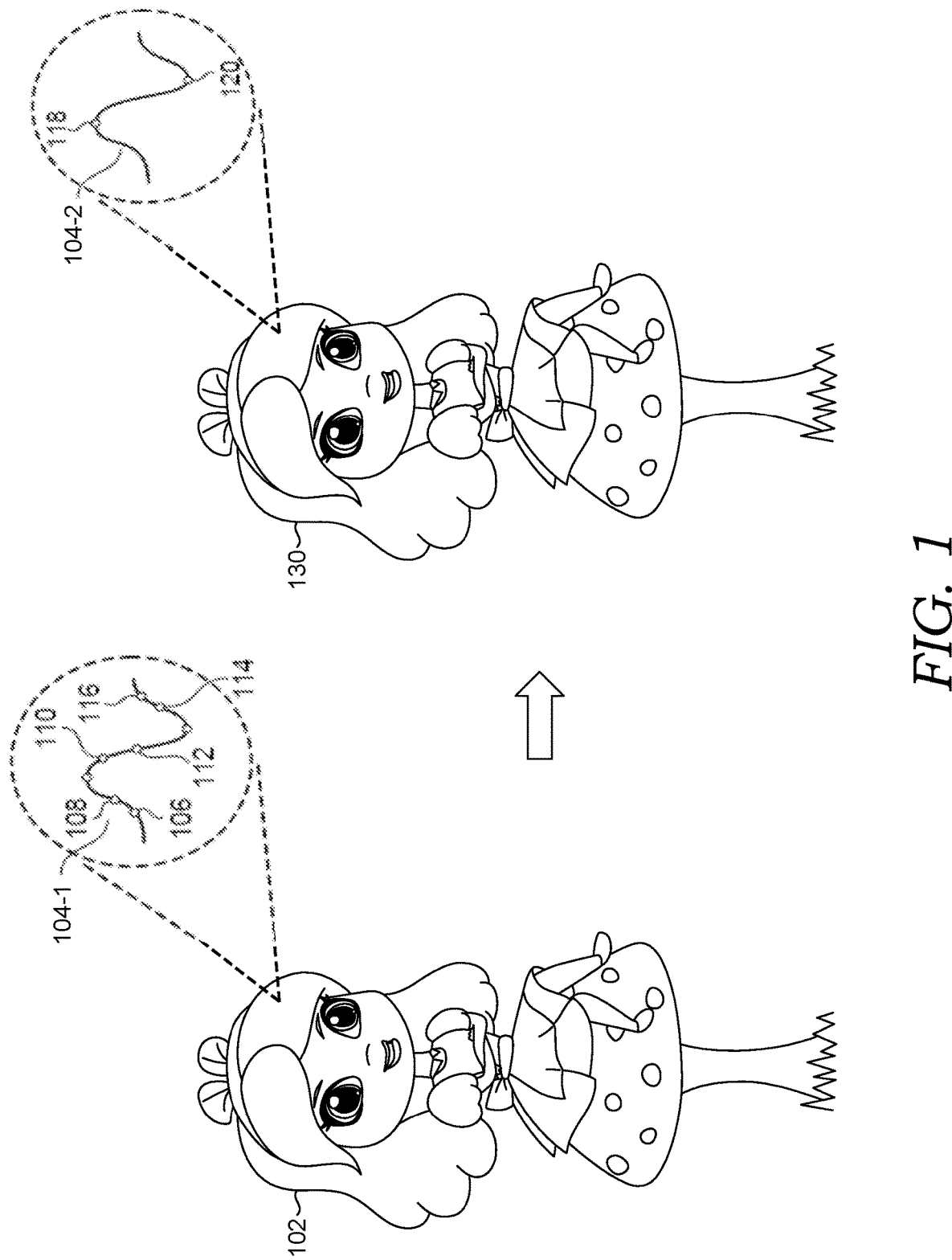
FIG. 1 is a schematic diagram illustrating a high level depiction of a removal of control points from an input image to produce an output image, according to some embodiments.

As described above, vector graphics can become overly complex. One use case is that there may be a curve that represents a simple shape, but it has thousands or millions of control points defining it, when the curve could have been represented with substantially fewer control points. In an illustrative example, there may be one large curve that is composed of many small sub-curves. However, each of those small sub-curves may require thousands of control points, even though the large curve could have been represented with substantially fewer control points.

There are several technical problems with an excessive quantity of control points and/or an excessive quantity of other vector objects (also referred to as "segments"). For example, excessive control points or segments (e.g., Bézier curves) lead to an unnecessary file size or memory consumption. For example, a pointer value may need to be stored in memory for every control point or segment to indicate its placement along a curve, which leads to excessive memory consumption when there are too many control points or segments. Further, images with excessive control points or segments require more computational power and energy consumption to render because more data needs to be rendered, resulting in "clunky" animations and overworked GPUs/CPUs. Moreover, there are bandwidth issues when performing functionality over a computer network. When vector graphics are used in online content, because there are an excessive quantity of control points and/or segments, an excessive amount of data is transmitted over a network (e.g., the internet). This means there are slower loading times, especially in regions with slow internet connections. Additionally, the user experience is hindered because there are more control points, making it harder to make modifications or adjustments. Lastly, printing can be problematic, especially on lower-resolution printers. There is more likelihood of fine details being lost or distorted during the printing process when there are too many segments.

To reduce complexity, simplification techniques may be performed. Simplification refers to the process of reducing the complexity of a vector graphics image or particular vector object while retaining its essential shape and characteristics. Simplification is used to optimize and streamline vector graphics for various purposes, including reducing file size, improving rendering performance, and making the image more manageable. Simplification is a core sub-routine found in various vector graphics editing technologies. However, these technologies have various technical deficiencies. For example, these technologies do not remove curves or control points in a lossless manner and do not measure how much error is determined when curves or control points are removed for optimization, thereby leading to lower quality results. "Lossless" refers to compression techniques that preserve all the original data and details of the image without any loss of quality. This is unlike "lossy" compression methods (as with existing technologies), which discard some image data to reduce file size, lossless compression essentially retains all the information in the image, allowing it to be reconstructed exactly as it was before compression.

Embodiments of the present invention provide one or more technical solutions to one or more of these technical problems, as described herein. Various aspects are directed to lossless removal of redundant control points or segments based on chain-to-chain and/or segment-to-segment distance computations. Additionally or alternatively, such removal may be based on identifying all possible lossless removal operations to ensure that the smallest possible zero-error (or near zero-error) representation of a given image. Subsequent lossy operations may be computed via local Gauss-Newton optimization and processing a priority queue.

In operation, particular embodiments first receive an input image (e.g., a vector graphics image). The input image may be represented by two or more chains that each include one or more segments. A "chain" as described herein refers to a continuous sequence of one or more segments. A "segment" as described herein refers to a line, curve, or any other suitable vector object (e.g., a single cubic Bézier curve). Each segment may include one or more control points that are configured to control a position of at least a respective portion of a respective segment.

Some embodiments determine a first distance between at least a portion of a first segment and at least a portion of a second segment. For example, as described in more detail below, some embodiments measure a distance between a respective portion of the first segment and a corresponding portion of the second segment as an integral over a shared parametric domain that is linearly warped into each segment's parameter space. A "shared parametric domain" is an allowable range of values for a parameter shared by the first segment and the second segment and the shared parametric domain defines the respective portion of the first segment and the corresponding respective portion of the second segment.

Based at least in part on the determination of the first distance, some embodiments determine that a second distance between a first chain and a second chain is within a threshold distance (e.g., they are determined to have the same or substantially the same parametric curve characteristics). For example, as described in more detail below, some embodiments perform such second distance computation based on mapping the first chain to the second chain by selecting which portion of the first chain and the second chain will be used when the second distance is determined. And based at least in part on the determination that the second distance between the first chain and the second chain is within the threshold distance, some embodiments remove at least a first control point.

In some embodiments, and as described in more detail below, the generating of an output image is based on ensuring that endpoints of a chain are continuous by forcing the position and tangent direction of endpoints. In some embodiments, the removal is representative of a first removal operation. Some embodiments place the first removal operation in a priority queue. The priority queue includes at least a second removal operation. The first and second removal operations are candidate operations to remove one or more control points. Some embodiments select the first removal operation via greedy optimization such that the removal is based at least in part on the selection. In this way, various embodiments ensure identification of the smallest possible zero-error representation operation (a lossless removal) for a given image.

Various embodiments of the present disclosure have various technical effects in light of various technical solutions that overcome one or more of the problems described above. For example, one technical solution is the removal of one or more control points and/or segments from an image. This results in various computer resource consumption savings. For example, because redundant control points and/or segments (e.g., those vector objects that are within a threshold distance) are removed, there is a significant reduction in memory consumption and file size (e.g., not as many pointer values to store in memory). Smaller files are easier to store, share, and load on digital platforms, which is especially important for web and mobile applications where bandwidth and storage space are limited.

Further, the removal of redundant control points and/or segments requires less computational power to render, making them ideal for applications where performance is critical, such as video games, interactive websites, and real-time simulations because less data needs to be rendered, thereby reducing GPU/CPU overload. Simplified vector graphics via the removal of redundant control points and/or segments can be rendered more quickly, resulting in smoother animations and faster user interactions. This is useful for creating responsive and engaging user interfaces. Further, there is enhanced compatibility. Some older or less capable devices and software may struggle to handle complex vector graphics. Simplifying these graphics via control point/segment removal can ensure they are compatible with a broader range of devices and applications.

Moreover, there is an improvement in bandwidth with control point/segment removal. When vector graphics are used in online content, the removal of redundant control points and/or segments reduces the amount of data that needs to be transmitted over a network. This is crucial for faster loading times for rendering the images over a network. Further, the removal of redundant control points and/or segments improves the user experience by making it easier to work with in vector graphic design software, making it simpler to make modifications or adjustments. Further, the removal of redundant control points and/or segments leads to improved printing results, especially on lower-resolution printers. These embodiments reduce the risk of fine details becoming lost or distorted during the printing process.

Various embodiments also have the technical effect of improved removal accuracy and overall image quality relative to existing simplifications technologies. For example, one technical solution is the removal of control points and/or segments based on determining a segment-to-segment (e.g., curve-to-curve) distance and/or a chain-to-chain distance. Such functionality improves removal accuracy and better quality image generation results because the distance computations are constructed to efficiently identify lossless removals of control points and/or segments as zero-cost (or near zero-cost) operations. As described above, existing simplification technologies do not remove curves in a lossless manner and do not measure how much error is determined when curves are removed, thereby reducing accuracy and image quality results.

Another technical solution for improving removal accuracy and image quality is the concept of selecting a removal operation (among one or more other removal operations) of a control point and/or segment to ensure lossless removal. For example, the removal of a control point may be representative of a first removal operation. Some embodiments place the first removal operation in a priority queue. The priority que includes at least a second removal operation. The first and second removal operations are candidate operations to remove one or more control points. Some embodiments select the first removal operation via greedy optimization such that the removal is based at least in part on the selection. In this way, various embodiments ensure identification of the smallest possible zero-error representation operation (i.e., a lossless removal) for a given image, unlike existing simplification technologies, which do not remove curves in a lossless manner and do not measure how much error is determined when curves are removed. Another technical solution is the removal of a control point and/or segment based on ensuring that endpoints of a chain are continuous by forcing the position and tangent direction of endpoints, as described in more detail below.

Example High Level Output

Referring now to FIG. 1, a schematic diagram illustrating a high level depiction of a removal of control points from an input image 102 to produce an output image 130, according to some embodiments. The input image 102 and output image 130 represent vector graphics images, whose elements are represented by a collection of Bézier curves (e.g., which includes curve 104-1 in input image 102 and curve 104-2 of the output image 130). FIG. 1 thus illustrates accepting, as input, collections of Bézier curves (e.g., including curve 104-1 in input image 102) and simplifies them losslessly to remove redundant control points, as illustrated via the curve 104-2 of the output image 130. Specifically, for example, the curve 104-1 has been simplified such that control points 106, 108, 110, 112, 114 and 116, on the curve 104-1 of the input image 102 have been removed from the curve 104-2 in output image 130, and which are represented by control points 118 and 120 in the output image 130. As described in more detail below, such lossy extension and removal produces much more simplified results without sacrificing visual quality, relative to existing technologies.

As described in more detail below, various embodiments employ a technique for reducing the number of segments (e.g. Bézier curves) and/or control points in a vector graphics while maintaining high fidelity. Various embodiments employ a curve-to-curve to repeatedly conduct local segment removal operations. By construction, various embodiments identify all possible lossless removal operations ensuring the smallest possible zero-error representation of a given design. In some embodiments, subsequent lossy operations are computed via local Gauss-Newton optimization and processed in a priority queue, as described in more detail below. Various embodiments can also generalize across different curve types (e.g., 2D and 3D) and can be used on curves with varying thickness and for vector graphics animations.

There are many ways that a design could end up with too many or too detailed curves: densely upsampling before applying a pointwise filter, adding anchors along curves but forgetting to delete them if they're never moved, scaling down a detailed design relative to its final display resolution, vectorizing raster art inefficiently, etc. With increasingly popular vector graphics animation formats, dense vector graphics designed for static display or print may now expect to be served up to mobile devices at high frame rates. Furthermore, vector graphics also function as path descriptions for CNC machines such as laser cutters, routers, and plotters. Overly dense designs cause fabrication defects or firmware failure.

Various embodiments demonstrate that existing simplification methods leave significant room for improvement. Some embodiments are implemented at the high end of the simplification-accuracy curve: simplifying as much as possible while remaining exceptionally accurate to preserve the artist's intention. A particular unit test is recovering lossless simplification. For example, taking a coarse spline, subdividing it repeatedly, and then trying to simplify back to the original number of curves. Existing methods found in the literature and in commercial software fail this seemingly simple test.

Various embodiments employ a simplification technique (e.g., a Bézier spline technique). Some embodiments conduct local segment removal operations in a priority queue. In some aspects, these operations are based on a measure of curve-curve distance which is carefully constructed to efficiently identify lossless removals as zero-cost operations. Once lossless removals are exhausted, subsequent lossy operations based on local Gauss-Newton optimization are conducted in a greedy manner in various embodiments.

As described in more detail below, lossless simplification removes geometrically unnecessary segments, and further lossy simplification produces a coarse, yet visually accurate design. As described in more detail below in the experimental results section, various embodiments consistently outperforms representative state-of-the-art methods. Some embodiments are agnostic to the dimension of the input curves' embedding space: aspects show results appending varying stroke thickness as a 3rd coordinate. Various aspects also demonstrate simplifying across an entire animation, implicitly ensuring temporally coherent control point distribution and movement.

As illustrated in FIG. 1, various embodiments take, as input, a vector graphics image 102 and outputs a simplified vector graphics image 130. Various embodiments operate directly on the underlying cubic Bézier splines representing the paths of standard vector graphics formats (e.g., .svg or .ai files). During editing, various embodiments homogenize all paths (e.g., circles, arcs, ellipses, quadratic Béziers) into cubic Bézier splines (e.g., via Inkscape, Illustrator, or CorelDRAW). These paths may define strokes, fill boundaries, clip-mask path boundaries, and other stylings. Various embodiments are agnostic to stylings, which are re-associated with the simplified output paths to render the final image.

Various embodiments described below refer to a segment, a chain, and a component. A segment refers to a single vector object, such as a single cubic Bézier curve. A chain $G^1$ refers to a continuous and smooth sequence of one or more segments. A component $C^0$ refers to a continuous sequence of one or more chains. Unless context demands, Bézier refers to cubic Bézier, but it is noted that Bézier curve or any mention herein can be replaced with or represent any other suitable segment or vector object.

In various embodiments, the input is a collection of N segments in $R^d$ (e.g., includes curve 104-1 of the input image 102) and a target number of output segments K. The output is a collection of K segments in $R^d$ (e.g., includes curve 104-2 of the output image 130) whose components closely match corresponding input components (components of the input image 102).

Various embodiments work in a greedy manner analogous to edge-collapse decimation for triangle mesh simplification in computer graphics. As described in more detail below, a local "collapse" operation removes a single segment and adjusts neighboring control points on the component in certain embodiments. Various embodiments define a non-negative (and sometimes zero) cost function to measure the loss incurred by each operation. All possible operations are placed into a priority queue and processed in a greedy manner in some aspects. When a collapse operation is conducted, operations involving neighboring segments become out of date and are replaced in the queue with operations referencing the newly repositioned control points in some aspects. In some embodiments, all local operations are constructed to have O(1) complexity so that total processing is asymptotically efficient:O(N log N).

Example System

Figure 2:
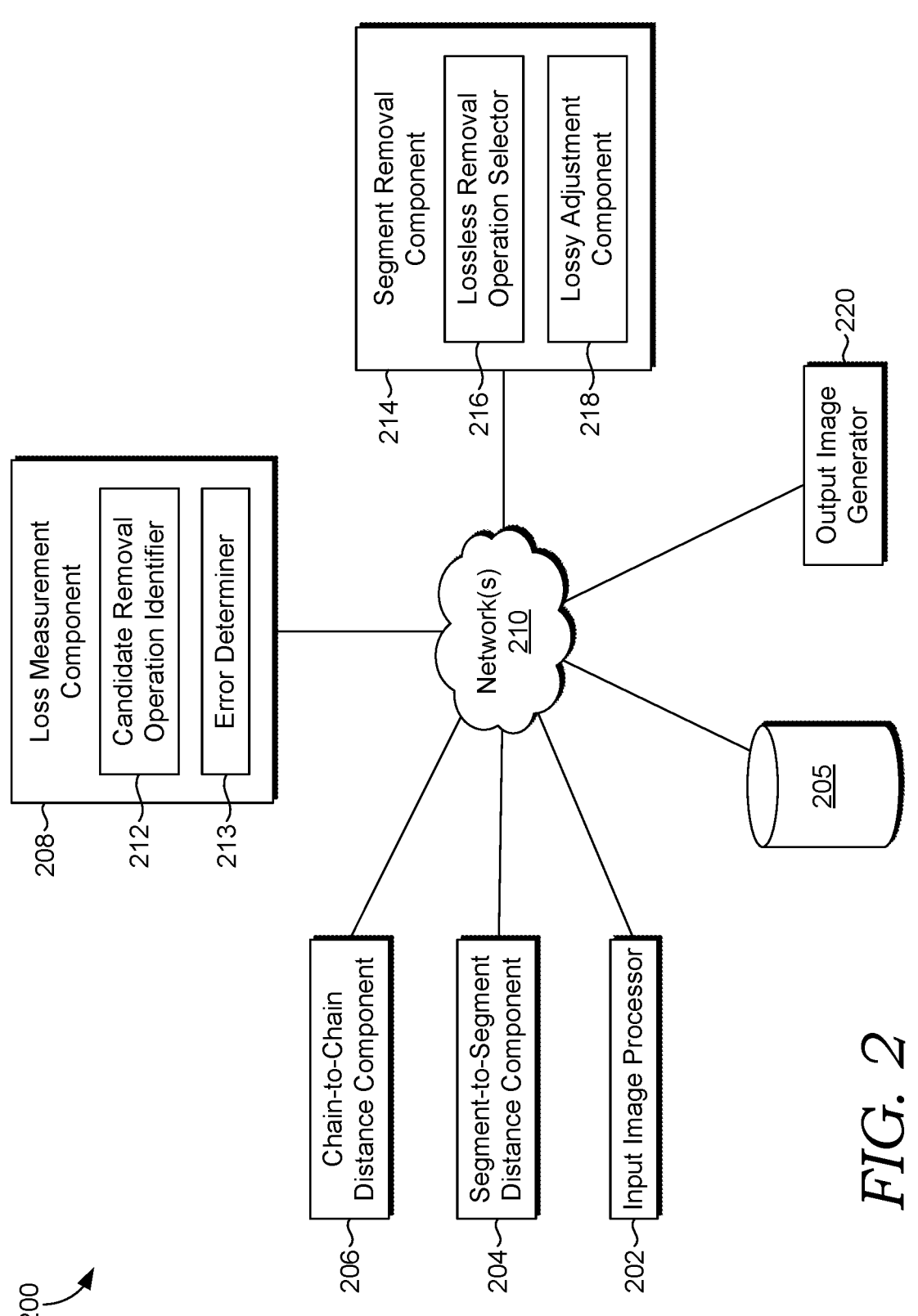
FIG. 2 is a block diagram of a computing system architecture in which aspects of the present disclosure are employed, according to some embodiments.

Referring now to FIG. 2, a block diagram is provided showing aspects of an example computing system architecture suitable for implementing an embodiment of the disclosure and designated generally as the system 200. The system 200 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1000 of FIG. 10). Alternatively, some or each of the components may be distributed among various computing devices, such as in a distributed cloud computing environment. In some embodiments, the system 100 and each of the components are located within the server and/or user device of FIG. 9, as described in more detail herein.

The system 200 includes network 210, which is described in connection to FIG. 9, and which communicatively couples components of system 200, including an input image processor 202, a segment-to-segment distance component 204, a chain-to-chain distance component 206, a loss measurement component 208, a segment removal component 214, an output image generator 220, and storage 205. The components of the system 200 may be embodied as a set of compiled computer instructions or functions, program modules, computer software services, logic gates, hardware accelerators, or an arrangement of processes carried out on one or more computer systems. The system 200 generally operates to generate an output image that is simplified via the removal of control point(s) and/or segments.

The input image processor 202 is generally responsible for modifying or representing an input image with components (including segments) and/or control points. For example, various embodiments receive an indication that a user has selected (e.g., clicked on) a vector object or path via a vector graphics selection tool (e.g., an arrow or black cursor) of an application (e.g., ADOBE ILLUSTRATOR). In some embodiments, once such a vector object has been selected, the anchor points and their control points automatically become visible. For instance, in response to receiving an indication that a user has selected a curve, its control points appear. In another example, various embodiments receive an indication that an anchor point has been selected. Responsively, the control points and the path segments associated with that anchor point are visually presented. Anchor points are the fundamental points that define the structure of a vector path, while control points are used to adjust the curvature and direction of the path segments between anchor points. Anchor points are the endpoints and significant corner points along a path or shape. Control points are used to manipulate the curves or angles between anchor points. In another example, Some vector graphics tools allow users to toggle the visibility of control points via an option or button in a menu or toolbar that allows a display or hiding of control points. To represent vector images as curves, particular embodiments store the positions of anchor points and their associated control points, as well as the information about how these points are connected by Bézier curves. This data can be saved in vector file formats like SVG (Scalable Vector Graphics) or AI (Adobe Illustrator), which store the information needed to recreate the image as a set of curves when the file is opened in a vector graphics software.

The segment-to-segment distance component 202 is generally responsible for determining a distance between one or more portions (e.g., each portion) of segments. Such distance computation is performed to determine how similar or different each segment is—whether two or more segments represent the same shape or parametric characteristics and by how much. Such distance computation can include any suitable curve or segment distance computation, such as Euclidean distance, point-to-curve distance, numeric integration, or parametric equations. For example, as described in more detail below, some embodiments measure a distance between a respective portion of a first segment and a corresponding portion of a second segment as an integral over a shared parametric domain that is linearly warped into each segment's parameter space. In this way, embodiments ensure that distance is measured at the appropriate locations between and along segment portions. In some embodiments, the segment-to-segment distance component 204 computes distance between portion(s) of segments in response to the input image processor 202 representing the input image as a set of segments, anchor points, and/or control points.

The chain-to-chain distance component 206 is generally responsible for determining a distance between one or more chains. In some embodiments, such functionality occurs based at least in part on determining the distance between one or more portions of segments. For example, in response to computing a distance for each portion of a first segment and each corresponding section of a second segment (as performed by the segment-to-segment distance component 204) the chain-to-chain distance component 206 takes the next two segments as input (a third segment that is connected to or a continuation of the first segment and a fourth segment that is connected to or a continuation of the second segment) to perform the same distance calculations and sums up the differences between all portions of all segments and chains. In some instances, as described in more detail, there may be differences in the quantity of segments of individual chains, which may necessitate a precise mapping between segments for distance computations. When there is one chain, for example, that has 4 segments and one chain that has 3 segments, various embodiments have to make a choice about the mapping between those segments in order to measure the distance. As described in more detail below, some embodiments map a first chain to a second chain by selecting which portion of the first chain and the second chain will be used when the distance between chains is determined.

The loss measurement component 208 is generally responsible for determining the error or loss between segments and/or candidate removal operations based on the distance determinations made by the chain-to-chain distance component 206 and/or the segment-to-segment distance component 204. For example, some embodiments randomly sample all curves (e.g., the sub-curve spanning from control point 106 to 108 of the input image 102) and take the mean squared $L^2$ distance to the output curves (e.g., the sub-curve spanning from control point 110 to 112 in the input image 102), then vice versa, and average the two errors to determine the final error. Thus, particular embodiments find a way to represent an input (e.g., the input image 102) in the most efficient manner possible (e.g., via producing the output image 130), minimizing any errors to zero (or as close to zero as possible). In other words, for FIG. 1, for instance, the objective is to reduce the data needed in the output image 130 to describe the input image 102 to the absolute minimum while ensuring complete accuracy (e.g., via removal of the sub-curve spanning from control point 110 to 112 because they represent an identical shape or parameter space).

Additionally (or alternatively), the loss measurement component 208 measures the loss incurred by each candidate removal operation. A candidate removal operation is an operation or process that is a candidate for removing one or more control points and/or segments (though the actual removal has not occurred yet). In some embodiments, each distance metric (e.g., computed by the segment-to-segment distance component 206) is stored as or represents a corresponding removal operation. In this way, for example, the curve-to-curve distance metric for each portion of a segment is used to repeatedly conduct local segment removal operations, where each local segment removal operation represents a distance measurement between a portion of a segment and a corresponding portion of another segment. Particular embodiments then place each local segment removal operation in a priority queue. These operations are based on a measure of segment-to-segment distance which is carefully constructed to efficiently identify lossless removals as zero-cost operations, as described in more detail below with respect to the lossless removal operation selector 216.

The removal operation identifier 212 is generally responsible for identifying all possible or candidate removal operations. For example, every pair of consecutive segments (e.g., and/or its corresponding removal operation and error measure) is initially placed in a priority queue based on its lossless (e.g., 2→1) operation. These are processed—pushing neighboring lossless (e.g., 2→1) operations onto the queue any time an operation is accepted—until the queue is empty or only K segments remain.

The error determiner 213 is generally responsible for determining the amount of error between chains and/or segments based on the distance computations of the segment-to-segment distance component 204 and/or the chain-to-chain distance component. For example, the error determiner 213 can determine the different distances and order the distances in a priority queue according to the difference magnitude. For instance, in some embodiments, the queue is arranged such that the top of the priority queue is the removal operation with the least quantity of error or distance and the bottom is the removal operation with the most quantity of error or distance.

The segment removal component 214 is generally responsible for removing one or more control points and/or segments. In some embodiments, the segment removal component 214 does so by taking, as input, the results of the loss measurement component 208. The segment removal component includes a lossless removal operation selector 216 and a lossy adjustment component 218. The lossless removal operation selector 216 is generally responsible for selecting the candidate removal operation with the least quantity of error (e.g., as determined by the error determiner 213) and then performing a corresponding lossless removal operation. For instance, the lossless removal operation selector 216 may take the removal operation from the top stack of the priority queue as populated by the candidate removal operation identifier 212 and implement such removal operation (e.g., actually remove a set of control points or generate an output image without the control points) since it is the most lossless relative to the other removal operations. A "lossless removal operation" as described herein refers to an operation or technique that does not cause any loss of information or quality. In other words, the design's essential characteristics and accuracy are maintained during these operations, which is based on the distance computations.

The lossy adjustment component 218 is generally responsible for performing one or more lossy adjustments or modifications (e.g., adding or changing the tangent or modifying a position of a control point) to remaining segments and/or control points that have not been removed. For instance, some embodiments ensure that endpoints (e.g., segments where anchor points are located) between segments stay continuous by warping, adding, or otherwise modifying ends of the segments. In some embodiments, such lossy operation adjustments are computed via local Gauss-Newton optimization and processed in a priority queue, as described in more detail below. That is, once lossless removals are exhausted (e.g., by the lossless removal operation selector 216), subsequent lossy operations based on local Gauss-Newton optimization are conducted in a greedy manner.

The output image generator 220 is generally responsible for generating an output image based on removing and/or adjusting segments and/or control points via the segment removal component 214. For example, as illustrated in FIG. 1, the output image 130 is generated, which includes less control points (control point 118 and 120) for the same curve 104-2 relative to the input image 102.

Storage 205 generally stores information including data (e.g., images), computer instructions (for example, software program instructions, routines, or services), data structures, and/or models used in embodiments of the technologies described herein. In some embodiments, storage 205 represents any suitable data repository or device, such as a database, a data warehouse, RAM, cache, disk, RAID, and/or a storage network (e.g., Storage Area Network (SAN)). In some embodiments, storage 205 includes images, such as vector graphics images. In some embodiments, each image is called or requested and returned, over the computer network(s) 210, depending on the component needing it, as described herein.

Example Operations

Figure 3:
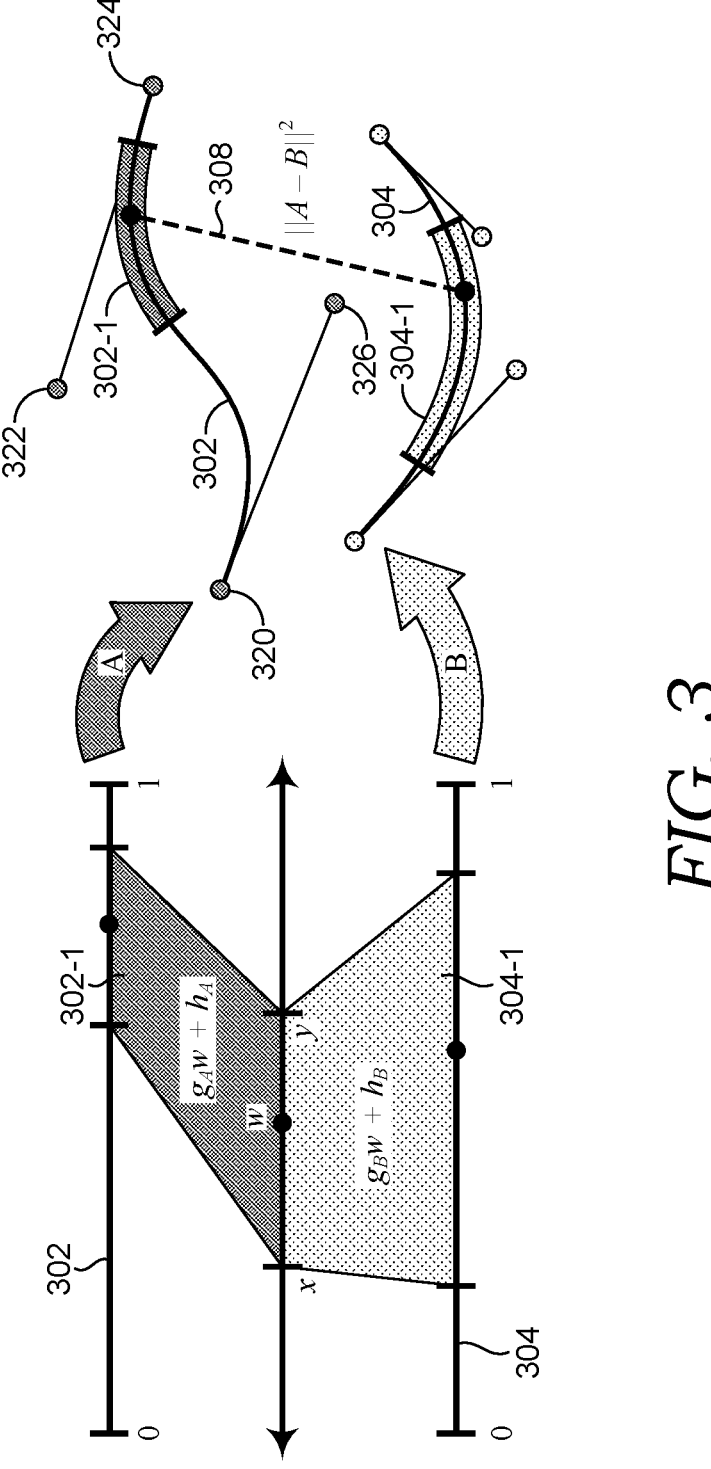
FIG. 3 is a schematic diagram illustrating how a distance between two Bézier curves is computed, according to some embodiments.

FIG. 3 is a schematic diagram illustrating how a distance between two Bézier curves 302 and 304 is computed, according to some embodiments. Specifically, FIG. 3 illustrates measuring the distance 308 between partial parametric spans 302-1 and 304-1 (i.e., portions) of two Bézier curves 302 and 304 as an integral over a shared parametric domain that is linearly warped into each segment's Bézier space. In other words, given the two curves 302 and 304, embodiments determine how similar and/or different they are by determining whether they represent an identical parameter space. In some embodiments, the segment-to-segment distance component 204 is responsible for making such computation with respect to FIG. 3, and as described herein.

FIG. 3 illustrates that the way the difference is computed is based on ensuring that the locations (e.g., between portions 302-1 and 304-1) at which the distance 308 is measured is appropriate to ensure a proper distance computation. For instance, one can imagine a first element sliding along portion 302-1 from left to right and a second element sliding along portion 304-1 from left to right with a string (representing the distance measurement 308) between them. Various embodiments summarize the distance over time as the two elements slide along each portion over time (or more formally, as different distance measurements are taken at different locations of segments). Accordingly, the speed at which the two elements slide along their respective curves matter (or more formally, the locations at which distance is computed along both curves 302 and 304 matter). The speed of the elements when sliding along the curves needs to be kept substantially the same. More formally, particular embodiments ensure the locations of distance computations along portions of the curves 302 and 304 are in alignment, as described in more detail below via the equation number (1). Equation number (1) below illustrates how various embodiments ensure the locations of the distance computations are aligned and that distance measurements are taken from the correct locations of the respective curves.

There are many ways to measure distance between two curves. Hausdorff distance is difficult to compute precisely and sensitive to outliers. Chamfer distance or integrated closest point is a good choice perceptually, but does not have a closed form expression and is sensitive to (near) overlaps and self-intersections. Meanwhile, Fréchet distance leverages that both curves may be parameterized over the real line segment [0,1]. Fréchet distance considers all possible reparameterizations of the two curves. Imagine taking the max distance between your left fingertip as it runs over one curve 302 and your right fingertip as it runs over the other curve 304. Fréchet distance takes the minimum across all possible parameterizations of each curve, or all possible speeds that our fingertips move relative to each other. Precise computation of Fréchet distance is somewhat tractable but has similar outlier issues as Hausdorff: ultimately the measure is determined by a single pair of points.

Various embodiments propose considering all possible pairs of piecewise-linear reparameterization of each segment (e.g., each portion, including 302-1 and 304-1, along the segments 302 and 304) with parameter locations co-located at each segment or portion boundary (e.g., within portions 302-1 and 304-1), but unlike Haus-dorff or Fréchet various embodiments take the integrated squared distance along the curves, such as 302 and 304. That is, the Bézier parameterization of each segment is only affected by a linear mapping, as illustrated in the left diagram of FIG. 3. This is both friendly to computation and a good model of perceived distance, indicated by qualitative results. Additionally, in some embodiments, the distance is zero if and only if a lossless merge is possible and smoothly increases away from this case, enabling gradient-based minimization.

Consider a Bézier segment $A:[0,1] \rightarrow R^d$ defined[1] by control points $a_1$, $a_2$, $a_3$, $a_4 \in R^d$ (e.g., curve 302 is defined by control points 320, 322, 324, and 326). Similarly, define another curve B: $[0,1] \rightarrow R^d$ with control points $b_1$, $b_2$, $b_3$, $b_4 \in R^d$. The parametric domains of A and B are both [0,1], but various aspects integrate distance over an arbitrary parametric subdomain:

[1]Au=1−u3a1+1−u2ua2+1−uu2a3+u3a4.

$$\int_x^y \|A(g_A w + h_A) - B(g_B w + h_B)\|^2 dw \tag{1}$$

where various parameters appear to control the measure: x, y control the stretch of a shared parametric domain from which the variable of integration w spans, $g_A, h_A$ and $g_B, h_B$ are parameters (e.g., controlling where the exact locations within 302-1 and 304-1 that the distance 308 is computed) which define an affine map from this shared domain to the Bézier parameter domains of curves A and B, respectively. In an instance, an affine map is a type of geometric transformation that preserves collinearity (the property of points lying on the same straight line) and ratios of distances between points.

Figure 4:
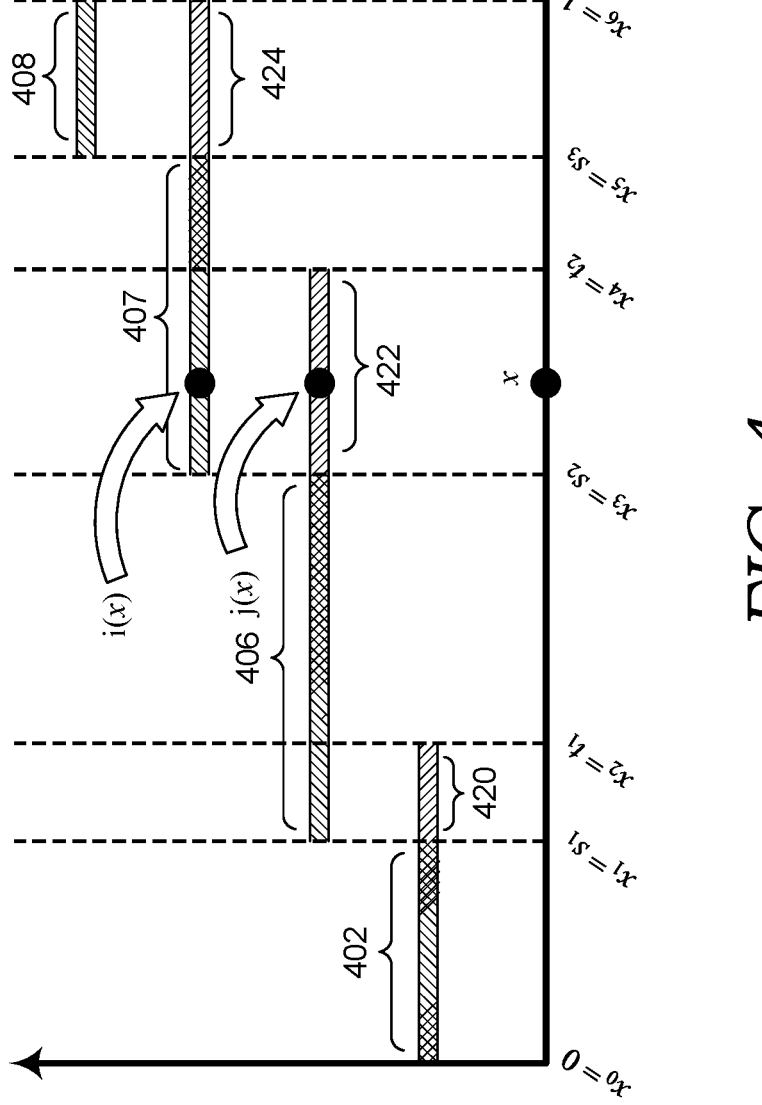
FIG. 4 is a schematic diagram of a graph illustrating chain-to-chain distance computations, according to some embodiments.

FIG. 4 is a schematic diagram of a graph 400 illustrating chain-to-chain distance computations, according to some embodiments. In some embodiments, the functionality described with respect to FIG. 4 is performed by the chain-to-chain distance component 206 of FIG. 2. Building on segment-to-segment distance, particular embodiments now consider distance between two chains.

Specifically, FIG. 4 and the equations described therewith illustrate that when one chain has 4 segments and another chain has 3 segments (or any other segment misalignment), various embodiments have to make a choice about the mapping between those segments in order to measure the distance between two chains. For instance, if one were to take the first 90% of a first chain and say that corresponds to the first 10% of the second chain, the distance measurements would be completely inaccurate. Various embodiments perform unique segment-to-segment distance computations (as described with respect to FIG. 3) to partially solve this problem but additionally uniquely map chains together, where there is a segment misalignment, as described below.

FIG. 4 illustrates the way some embodiments mathematically implement those choices of how two curves or segments are mapped to each other along a chain. The graph 400 specifically illustrates 4 segments 402, 406, 407, and 408 of a first chain and only 3 segments 420, 422, and 424 of a second chain that are not shared by the first chain. Distance is first measured at 0 for both chains and ends at 1 for both chains. This indicates which segment distance is being measured over time. Interspersed elements, such as 430, indicated that elements happen to be sliding along the second segment for both chains at the same time.

Continuing with FIG. 4 and concepts related to chain-to-chain distance computations, consider a chain of n segments: $A:[0,1] \rightarrow R^d$ defined by control points $P=\{p_1, \ldots p_{3_{n+1}}\}$ and a set of n+1 parameter locations $s_0, s_1, \ldots, s_n \in [0,1]$ (e.g., portions 302-1 and 304-1) where $s_0=0$ and $s_n=1$:

$$A(x) = \left\{ A^1\left(\frac{x-s_0}{s_1-s_0}\right) \text{ if } x \le s_1 A^2\left(\frac{x-s_1}{s_2-s_1}\right) \text{ else if } x \le \right. \tag{2}$$

-continued $$s_2 : A^i\left(\frac{x - s_{i-1}}{s_i - s_{i-1}}\right) \text{ else if } x \le s_i : A^n\left(\frac{x - s_{n-1}}{s_n - s_{n-1}}\right) \text{ else if } x \le s_n,\bigg\}$$

where points $p_{3i-2}, p_{3i-1}, p_{3i}, p_{3i+1}$ control each segment $A^i$.

Similarly, define a chain $B:[0,1] \to R^d$ with n−1 segments with control points $Q=\{q_1, \ldots, q_{3n-2}\}$ and parameter locations $t_j$. For each of these, let us define piecewise-constant indexing functions:

$$i: [0, 1] \to \{1, \ldots, n\}, \text{ where } i(x) = i \text{ if } s_{i-1} < x \le s_i, \quad (3)$$

and $$j: [0, 1] \to \{1, \ldots, n-1\}, \text{ where } j(x) = j \text{ if } t_{j-1} < x \le t_j. \quad (4)$$

Without loss of generality, assume the parameter locations $s_i$ and $t_j$ are disjoint (outside of endpoints) so they cut up the domain [0,1] into 2n−2 intervals. Since $s_i$ and $t_j$ may be in any order relative to each other, we introduce a joint sequence notation:

$$\{x_0, x_1, \ldots, x_{2n-2}\} = \{0, \text{sort}(s_1, \ldots, s_{n-1}, t_1, \ldots, t_{n-2}), 1\}, \quad (5)$$

While this simplifies notation, it obscures that each parameter location $x_k$ depends (when it comes to derivatives) on some $s_i$ or $t_j$; this will be useful for correct gradient computation later.

Equipped with a way to refer to these intervals in order, we may define a distance between these chains as a sum over intervals:

$$E(P, \{s_i\}, Q, \{t_j\}) = \quad (6)$$

$$\sum_{k=1}^{2n-2} w_k \int_{x_{k-1}}^{x_k} \left\| A^{i(x)}\left(\frac{x - s_{i(x)-1}}{s_{i(x)} - s_{i(x)-1}}\right) - B^{j(x)}\left(\frac{x - t_{j(x)-1}}{t_{j(x)} - t_{j(x)-1}}\right) \right\|^2 dx,$$

where—despite the indexing hellscape—we observe that each term in the summation is an integral of the form in Eq. (1). The $w_k$ term weighs the impact of the kth integral on the total. One choice would be to use the arc-length of the corresponding pieces of the segments of A and B. This will be problematic in our setting because only the longer curve A is known in advance and approximating arc-lengths of Bézier curves relies on computationally expensive operations. Instead, some embodiments use $$w_k = \frac{1}{(s_i - s_{i-1})} + \frac{1}{(t_j - t_{j-1})},$$

which can be seen as a first-order approximation of arc-length (i.e., assumes segments are straight) and discourages intervals from disappearing by inversely proportionally growing in scale. We draw special attention that $w_k$ therefore depends on some $s_i$ and $t_j$ values.

Figure 5:
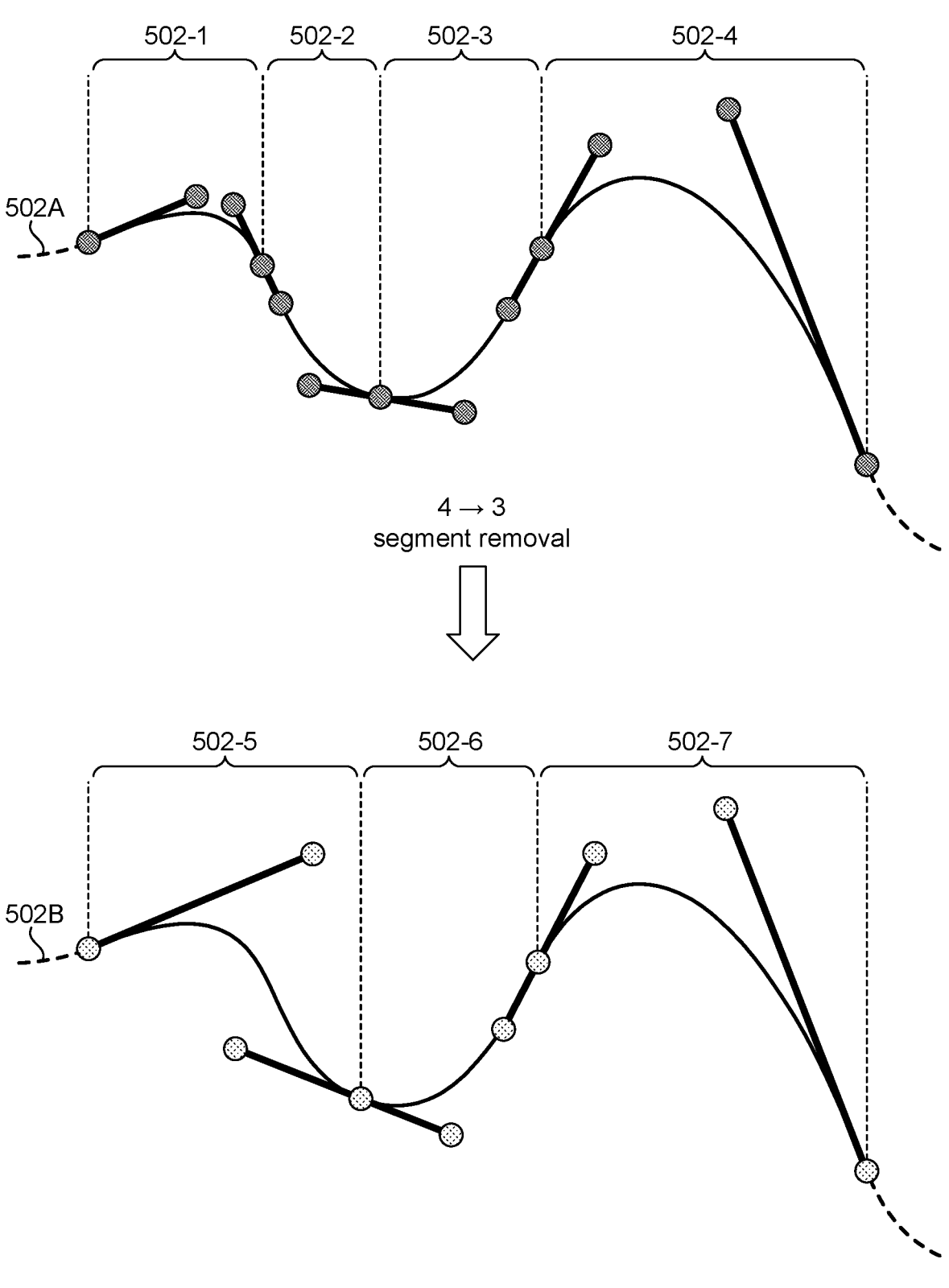
FIG. 5 is a schematic diagram illustrating how segments and control points are removed from a first chain, according to some embodiments.

FIG. 5 is a schematic diagram illustrating how segments and control points are removed from a first chain 502, according to some embodiments. In some embodiments, such removal is performed by the segment removal component 214 of FIG. 2. FIG. 5 illustrates that a chain, 502 (502A) is initially represented with a length of 4—i.e., four segments 502-1, 502-2, 502-3, and 504-4. After the chain-to-chain distance component 206 performs its functionality and the loss measurement component 208 performs its functionality, the segment removal component 214 may perform its functionality, where the output is the final representation of the chain 502 (illustrated as chain 502B), where a curve of length 3 (i.e., segments 502-5, 502-6, and 502-7) is provided that is as close as possible to the input chain 502A of length 4. For example, particular embodiments remove one of the segments (e.g., segment 502-2) that removes 3 control points from the curve. Then particular embodiments optimize the positions (e.g., via the lossy adjustment component 218) of the remaining control points to minimize the distance. In various embodiments, the function object is to get a measurement distance as close to zero as possible.

Analogous to an edge-collapse operation for triangle meshes, particular embodiments define a local segment removal operation for a chain of length n, defined by control points $P=\{p_1, \ldots, p_{3n+1}\}$. For now, various aspects assume the input to this subroutine are n segments forming a chain within a possibly longer chain continuing at either end. The outputs are n−1 segments defined by control points $Q=\{q1, \ldots, q3n-2\}$ and a measured cost of accepting this solution:

$$\text{cost} = E(P, \{s_i\}, Q, \{t_j\}). \quad (7)$$

Various aspects are now described with respect to a general use case or example (n≥2). The cost in Equation (7) is a minimization of a continuous function of the unknowns $\{s_i\}$, Q, $\{t_j\}$. Various embodiments optimize this via a modified Gauss-Newton method. By appending constraints to this optimization, aspects ensure $C^0$ and $G^1$ continuity at the endpoints (where the chain joins neighboring segments) and at internal interpolated control points in the output (for n>2). Namely, aspects maintain $C^0$ continuity with:

$$q_1 = p_1 \text{ and } q_{3n-2} = p_{3n+1} \quad (8)$$

and $G^1$ continuity with:

$$\exists \alpha > 0 \,|\, q_2 - q_1 = \alpha(p_2 - p_1), \quad (9)$$

$$\exists \beta > 0 \,|\, q_{3n-3} - q_{3n-2} = \beta(p_{3n} - p_{3n+1}), \quad (10)$$

$$\exists \gamma j > 0 \,|\, q_{3j} - q_{3j+1} = \gamma j(q_{3j+1} - q_{3j+2}) \forall j = 1, \ldots, n-2. \quad (11)$$

The constraints in Equation (8) can be substituted into Equations (9) & (10), revealing they are linear in $\alpha$, $q_2$ and $\beta$, $q_{3n-3}$, respectively. These are easily enforced via the null-space method: introducing $\alpha$ and $\beta$ as variables. That is, various embodiments build a matrix $N \in R^{d(3n-2) \times (3d(n-2)+2)}$ from relevant entries of P so that:

$$Q = Ny + Q^\sim \text{ such that } Eqs. 8-10 \text{ hold for any } y \in R^{3d(n-2)+2} \quad (12)$$

where y collects remaining free variables in Q and $\alpha$, $\beta$.

Meanwhile, the constraints in Equation (11) are bi-linear in the $\gamma_i$s and Q, respectively. Treating the s, $\gamma$, and t variables as known, the cost function is then a quadratic function in Q. This implies it has a closed-form solution $Q^*$, which can be expressed as a nonlinear function $f:R^{3n-5} \to R^{d(3n-2)}$ of $\gamma$, s, and t variables:

$$Q^* = f(\{s_i\}, \{\gamma_j\}, \{t_j\}). \tag{13}$$

Various embodiments can now substitute $Q^*$ from equation (13) into the optimization problem in Equation (7) to get a non-linear optimization problem over $\{s_i\}$, $\{\gamma_j\}$, $\{t_j\}$:

$$E(P, \{s_i\}, f(\{s_i\}, \{\gamma_j\}, \{t_j\}), \{t_j\}). \tag{14}$$

While simple gradient descent could be applied, there are significant improvements leveraging the sum-of-squares nature of the distance in equation (6) to use Gauss-Newton method.

Because the integrands in equation (1) are sixth-order polynomials over the integration variable (squared norm of a cubic polynomial), some embodiments immediately apply sixth-order accurate quadrature rules to exactly evaluate these integrals for any input parameters.

$$\sum \int \| \ldots \|^2 \xrightarrow{\text{exact quadrature}} \sum \sum \| \ldots \|^2 = \sum \| \ldots \|^2$$

Our sum of integrals is now a simple sum of squared function evaluations: suitable for discrete Gauss-Newton method. The quadrature rules may be used as a measure to inform the system when to stop and/or start for removal operations.

All that remains is to apply chain-rules and differentiate each term with respect to the free variables. Some embodiments use complex-step numerical differentiation to easily (without hand-coding any derivatives), accurately (up to machine precision), and efficiently (with little more cost than a few forward evaluations) compute necessary Jacobian matrices. For small n (in our cases $n \leq 4$), this choice is appropriate. For much larger n (e.g., $n=O(N)$), sophisticated automatic-differentiation tools may start to see performance improvements.

Given a Gauss-Newton search direction, particular embodiments conduct a back-tracking line-search to find a suitable step length, while constraining $\alpha$, $\beta$, $\gamma$ parameters to stay positive. For our most common case of $n=4$, particular embodiments observe convergence typically in $\approx 10$ iterations. For fixed n, this entire local optimization is O(1) with respect to the complete input vector graphics image of N segments.

To initialize optimization, some embodiments set $s_i = \sum_{k=1}^{i} \ell_k / \sum_{k=1}^{n} \ell_k$, where $l_i$ is the arc-length of the ith segment (approximated numerically). Then some embodiments pick the best $(t_j)$ initial values among all $n-1$ subsequences of $\{s_i\}$ and an additional uniform setting of $s_i=1/(n-1)$. For small n, it is observed that trying a few initial values often helps speed up convergence. The specific heuristic described above ensures that the input chains of $n-1$ straight segments are immediately identified, where one segment can always be losslessly removed. Tangent length ratios $\alpha$, $\beta$, $\gamma$ are initialized to relative arc-lengths: again agreeing with constant speed straight segments.

Various embodiments described below reference a particular special lossless use case or example of $n=2$. If $n=2$ and we know that we are only interested in accepting the segment removal for numerically zero cost, then some embodiments can avoid the continuous optimization of the previous section and jump directly to the solution of the low-order polynomial root finding problem.

One key observation is as follows: A lossless segment removal on a two-segment chain defined by control points $c_1$, $c_2$, $c_3$, $c_4 \in R^d$ and $d_1$, $d_2$, $d_3$, $d_4 \in R^d$ exists if and only if there exists a single curve with control points $q_1$, $q_2$, $q_3$, $q_4 \in R^d$ and a parameter value $t \in (0,1)$ such that subdividing the q at t produces the segments c and d.

The output segment q has constant third derivative, so to admit a lossless removal the inputs must have equal third derivatives must be equal up to a scale factor. That scale factor can be written in terms of a parameter $t \in (0,1)$ such that c and d segments are the result of splitting the output segment q at t:

$$-6q_1 + 18q_2 - 18q_3 + 6q_4 = \tag{15}$$

$$\frac{-6c_1 + 18c_2 - 18c_3 + 6c_4}{t^3} = \frac{-6d_1 + 18d_2 - 18d_3 + 6d_4}{(1-t)^3}, \tag{16}$$

$$\frac{\ddot{c}}{t^3} = \frac{\ddot{d}}{(1-t)^3}, \tag{17}$$

Where aspects further assume that third-derivatives $\dddot{c}$, $\dddot{d} \in \mathbb{R}^G$ are nondegenerate (if they both are, then the segments could be merged as quadratic or linear Bézier curves).

Now, some embodiments can solve this third-order polynomial equation for t:

$$\frac{\dddot{c}}{\dddot{d}}(1-t)^3 = t^3 \tag{18}$$

$$-(1+r)\tau^3 + 3rt^2 - 3rt + r = 0. \tag{19}$$

For $r>0$ (implying $\dddot{c}$ and $\dddot{d}$ point in the same direction), this equation has a single real root:

$$t = \left(1 + r^{-\frac{1}{3}}\right)^{-1}. \tag{20}$$

Finally, if this lossless removal is possible, then various embodiments can recover the corresponding control points from the continuity assumptions:

$$q_1 = c_1 \tag{21}$$

$$q_4 = c_4 \tag{22}$$

$$q_2 - q_1 = \frac{c_2 - c_1}{t} \tag{23}$$

$$q_4 - q_3 = \frac{d_4 - d_3}{1-t} \tag{24}$$

To determine if a lossless removal is actually possible, on practical approach example is to compute t and $q_i$ as above and then check if the integrated error between the original two segments and the new single segment (using equation (6)) is (numerically close enough to) zero.

Assuming an infinite precision machine, a straightforward algorithm for lossless simplification of a sequence of n segments is to process all consecutive pairs of segments in a queue or stack. Upon each pop, if the pair is still valid and can be losslessly merged, then some embodiments conduct it and insert any new consecutive pairs into the queue. The $2 \rightarrow 1$ merge operation is local and O(1) cost, and the full algorithm is O(n). The algorithm is also guaranteed to find all possible lossless mergers, resulting in the most compact lossless representation.

In practice, floating point operations introduce errors and these errors may accumulate. In the worst case, some embodiments merge pairs in order along a chain of N segments all stemming from a single (K=1) curve, accumulating error N times over before the final merge. Instead, some embodiments can process operations in a queue, which accumulates the worst case error at a rate of log N.

In some embodiments, the cubic root finding relies on floating point operations which are not error-free. It is observed that in the range $t \in [10^{-3}, 1-10^{-3}]$ the numeric loss for theoretically lossless merges is very low $< 10^{-16}$. However, this numeric loss grows toward larger values $\approx 10^{-5}$ as the solution t gets closer to 0 or 1. Some embodiments apply one iteration of the Gauss-Newton descent on E (mirroring the general-case in the previous section), initialized at the c and t values to "brush off" the last bit of numerical error.

Equipped with our local operations, various embodiments split the input into chains at corners, determined by a threshold on incident tangents. The following description describes how a priority queue may be populated, as described with respect to the candidate removal operation identifier 212 and the lossless removal operation selection 216, for example. In some embodiments, every pair of consecutive segments (e.g., corresponding to removal operations) is initially placed in a priority queue based on its lossless $2 \rightarrow 1$ operation (e.g., as described above). In some embodiments, these are processed—pushing neighboring lossless $2 \rightarrow 1$ operations onto the queue any time an operation is accepted—until the queue is empty or only K segments remain.

If more than K segments remain, then for every consecutive four segments various embodiments push a (potentially lossy) $4 \rightarrow 3$ removal operation on the priority queue. For chains of length n<4, some embodiments also push an appropriate $n \rightarrow (n-1)$ removal operation. These are processed—again pushing appropriately updated neighboring operations upon each acceptance—until K segments remain in some embodiments. Some embodiments use a priority queue with pop-min, update-key, and insert operations with cost O(log n), keyed on the cost of each possible $4 \rightarrow 3$ or $2 \rightarrow 1$ operation. Computing each cost is O(1) and there are O(n) operations: filling the queue has thus a O(n log n) cost. Finding the cheapest operation is O(log n), executing it O(1), and updating the cost of the neighboring elements is O(log n) (note that the number of neighbors is constant): overall, it is O(log n) total work per pop. Since we have $K \leq n$ operations to pop, the final time complexity is O(K log n+n log n)=O(n log n).

Finally, the basic algorithm in some embodiments assumes all corners are pre-identified at the beginning. Some embodiments can also simplify across corners (cost permitting) by relaxing the $G^1$ constraints in equation (11) based on a user-provided threshold. To support loops: during the local segment removal optimization for closed loop chains of length≤n, $G^1$ continuity constraints are appropriately modified in some embodiments so that the choice of endpoints is unbiased.

Experimental Results

Figure 6:
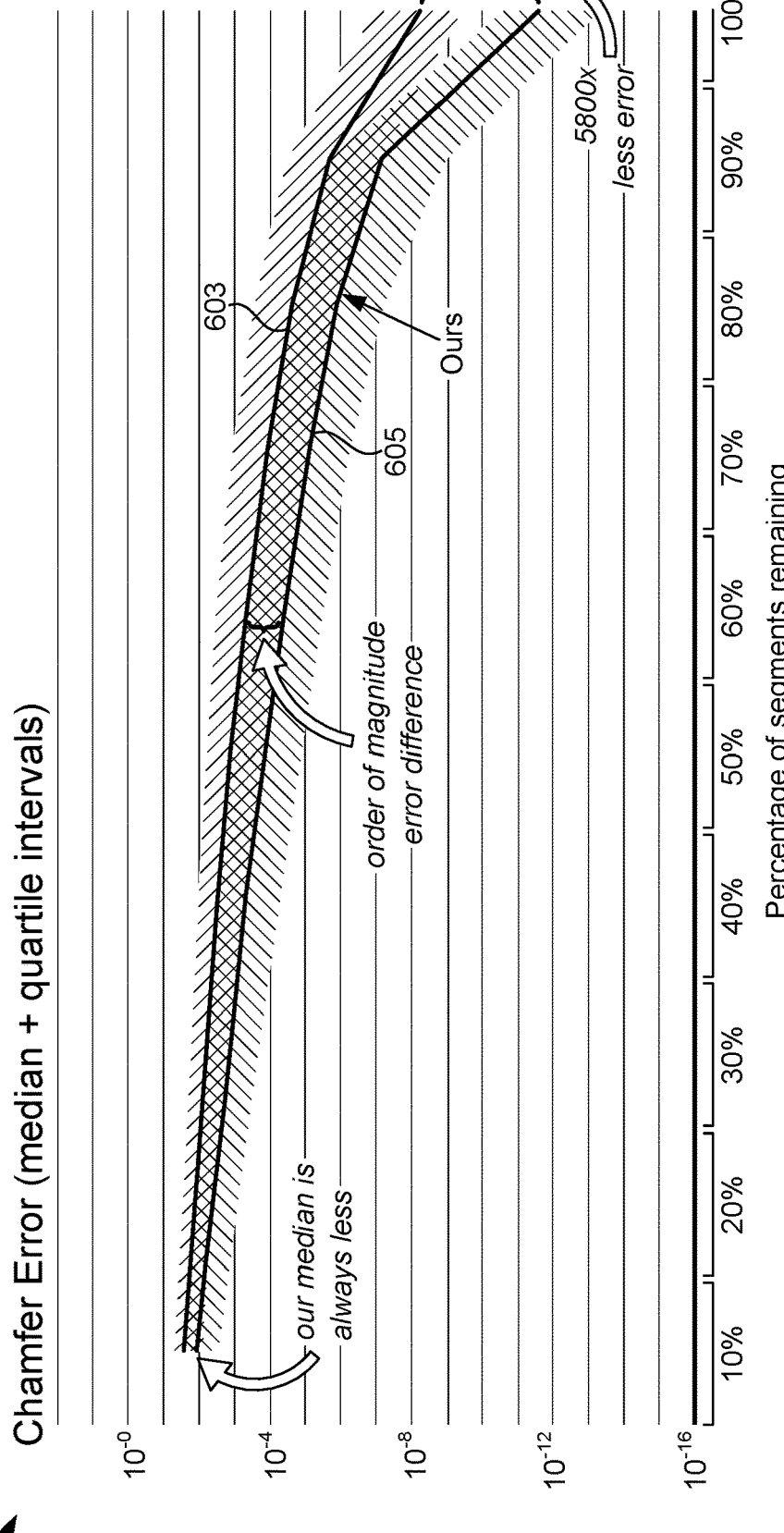
FIG. 6 is a graph that illustrates less Chamfer error relative to an existing technology, according to some embodiments.

FIG. 6 is a graph 600 that illustrates less Chamfer error relative to an existing technology, according to some embodiments. The graph 600 represents only one of various experiment results tests the inventors have conducted. The inventors conducted a large-scale benchmark of vector graphics simplification, which as far as they know, is the first of its kind. They compared various simplification methods for embodiments described herein (such as described in FIG. 1) (labeled as "ours" or "our") to other technologies (e.g., Schneider 1990) for a variety of target segment counts. The inventors binned the collected samples in deciles and reported their medians and quartile intervals. Our method's median is always smaller though best improvements are observed for larger percentages. For visualization clarity, the inventors snap extremely small errors of our lossless results to axis bounds.

In terms of experiment setup, the inventors conducted a large-scale quantitative evaluation on 17,944 in-the-wild .svgs composed of 55 million segments in total from Open-ClipArts dataset [Hu et al. 2019] ($\approx$2 k models were excluded because our .svg loader does not support esoteric path commands). Our lossless simplification benefited 74.2% of the models. This suggests that most vector graphics found in the wild could save on storage and bandwidth without any noticeable change, motivating our lossless contributions. Our method demonstrates favorable quality for the same simplification amount compared to [Schneider 1990] (FIG. 6). For each model, the inventors considered a series of K values: they run our lossless process until completion $K=K_{lossless}$, then applying our lossy process to reach K=90%, 80%, . . . , 10% of the original number of segments until no lossy removal is possible without exceeding a very large error value. They ran (Schneider 1990) until achieving roughly the same K values. The inventors measured bidirectional chamfer error between the input and output: densely, uniformly randomly sampling all curves of the input and taking the mean squared $L^2$ distance to the output curves, then vice versa, and averaging the two errors. Our method outperforms (Schneider 1990) across the entire range of the simplification amount: the median curve mostly staying around an order of magnitude lower, with a much large difference improvement in the 90-100% range.

Example Flow Diagrams

FIG. 7 is a flow diagram of an example process 700 for generating an output image based on control point removal, according to some embodiments. The process 700 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 6). The computer-implemented method, the system (that includes at least one computing device having at least one processor and at least one computer readable storage medium), and/or the computer readable medium as described herein may perform or be caused to perform the process 700 or any other functionality described herein.

Per block 702, some embodiments access (e.g., from memory or storage 205), an input image (e.g., the input image 102 of FIG. 1). The input image is represented by two or more chains that each include one or more segments. Each segment includes one or more control points that are configured to control a position of at least a respective portion of a respective segment. The input image excludes pixels (i.e., does not contain any pixels). In some embodiments, "control points" include any suitable point in vector graphics, such as "anchor points," even though these may be different vector objects, as described above. Accordingly, any suitable point may be removed, not just control points.

In some embodiments, the input image represents any suitable image, such as a vector graphics image, where the vector graphics image is an image generated using a sequence of commands or mathematical statements that place at least one of, lines, curves, and shapes in two-dimensional or three-dimensional space. In other embodiments, the input represents any suitable object that contains lines or curves, such as line art. Line art is similar to vector graphics in that it primarily uses lines to create images, but it is not necessarily created or edited in a vector format. Line art can be in raster format and is often used for illustrations, diagrams, and technical drawings. In some embodiments, other applications include font design. Font designers may create animation-based fonts with varying thickness and spacing. For example, letters can change in thickness over time slices. For example, there may be a sharp kin instead of a smooth hump in animation. Designers need to decide where to place points or kinks. The distance measures described herein, for example, can be used for deciding where to place smooth humps or sharp corners. Accordingly, an "input image" or "output image" may represent any suitable data object with lines or curves. In some embodiments, each segment represents a Bézier curve, though it is recognized that any suitable curve, line, or object may additionally or alternatively be represented, such as a Basis Spline (B-spline), Catmull-Rom Splines, etc.

Per block 704, some embodiments determine a first distance between at least a portion (e.g., portion 302-1 of FIG. 3) of a first segment (e.g., segment 302), of the one or more segments, and at least a portion (e.g., portion 304-1) of a second segment (e.g., segment 304), of the one or more segments. As described herein, any suitable distance metric may be used as described, for example, with respect to the segment-to-segment distance component 204. In some embodiments, the determination of the first distance includes measuring a distance between a respective portion of the first segment and a corresponding portion of the second segment (e.g., portions 302-1 and 304-2 of FIG. 3) over a shared parametric domain. A shared parametric domain is an allowable range of values for a parameter shared by the first segment and the second segment. The shared parametric domain defines the respective portion of the first segment corresponding to the respective portion of the second segment. Examples of this are described with respect to FIG. 3, where the distance between portions 302-1 and 304-1 of the segments 302 and 304 is represented as an integral over a shared parametric domain that is linearly warped into each segment's parameter space.

Per block 706, based at least in part on the determination of the first distance, some embodiments determine that a second distance between a first chain, of the two or more chains, and a second chain, of the two or more chains, is within a threshold distance. Examples of this are described with respect to the chain-to-chain distance component 206, the error determiner 213, FIG. 4, and equations (2) through (6) described herein. For example, the error determiner 213 may determine that, among all removal operations, the distance between the first chain and the second chain is the closest or the closest to zero error.

In some embodiments the first chain has a first quantity of segments (e.g., 4, as illustrated by 502A) and the second chain has a second quantity of segments (e.g., 3 as illustrated by 502B). In these asymmetric cases where chains have a different quantity of segments, particular embodiments determine the second distance based on mapping the first chain to the second chain by selecting which portion of the first chain and the second chain will be used when the second distance is determined (e.g., as described with respect to FIG. 3 and FIG. 4).

Per block 708, based at least in part on the determination that the second distance between the first chain and the second chain is within the threshold distance, some embodiments remove at least a first control point, of the one or more control points. Examples of this are described with respect to the segment removal component 214 of FIG. 2. In some embodiments, "removing" a control point or segment just means generating the output image without control point(s) and/or segments that were in the input image. In these embodiments, no control points or segments are directly removed. Rather, an output image is just generated without them. In other embodiments, "removing" means to actually delete or remove from an input image so that the result of the deletion is the output image. In some embodiments, one or more segments are additionally or alternatively removed.

For block 710, based at least in part on the removal, some embodiments generate an output image (e.g., the output image 130 of FIG. 3). In some embodiments, the generating of the output image is further based applying Gauss-Newton optimization as described herein. Examples of this are described with respect to the lossy adjustment component 218 between equations (8) and (14). In some embodiments, the removal of at least the first control segment is indicative of removing the first segment, of the one or more segments, such that the output image includes each segment, of the one or more segments, except for the first segment. For example, by removing a segment, each control point on this segment is also removed by default. In various embodiments, to "remove" a segment does not mean to lower the order of a curve (e.g., from cubic to quadratic). For example, one can adjust a control point on a curve, which changes the curve into a straight line (which means that there is no longer a curve). Rather, to remove a segment in some embodiments means to completely delete the segment such that there are no corresponding control points and the segment is no longer visible or in an image at all.

In some embodiments, the removal of at least the first control point is representative of a first removal operation. Various embodiments place the first removal operation in a data structure (e.g., a priority queue). The data structure includes at least a second removal operation. Such removal operations are candidate operations to remove one or more control points. Various embodiments then select the first removal operation (e.g. via greedy optimization) such that the removal of at least the first control points is based at least in part on the selection. For example, before removal of the first control point actually happens, various embodiments perform various distance calculations between a first chain and other candidate chains (e.g., as described in block 706 and described above with respect to finding a chain with 3 segments that is as close as possible to the chain with 4 segments). Each of these distance measurements and corresponding chains are placed in the priority queue. The first operation may be the most optimal or the closest in distance (e.g., the first chain is closest to the second chain in distance, as opposed to any other chain), representing the closest to zero-error. Therefore, embodiments select the first chain or first removal operation for removal. Examples of this are described with respect to the candidate removal operation identifier 212 and the lossless removal operation selector 216.

In some embodiments, the generation of the output image at block 710 includes modifying a position (at the output image) of at least a second control point that has not been removed based at least in part on the removal of at least the first control point. Examples of this are described with respect to the lossy adjustment component 218 and ensuring that endpoints of at least one of, the first chain or the second chain is continuous after applying Gauss-Newton optimization.

FIG. 8 is a flow diagram of an example process 800 for generating an output vector graphics image, according to some embodiments. Per block 803, some embodiments access (e.g., from computer storage 205) a vector graphics input image (e.g., image 102). The vector graphics image is represented by one or more segments. The vector graphics image excludes any pixels (e.g., as in raster graphics). Per block 805, particular embodiments determine a distance between a first segment and a second segment, of the one or more segments. Examples of this are described with respect to the segment-to-segment distance component 204.

Per block 807, based at least in part on the determination of the distance at block 805, some embodiments identify a first removal operation and place the first removal operation in a data structure (e.g., a priority queue). The data structure includes at least a second removal operation. The first removal operation and the second removal operations are candidate operations to remove at least one of, one or more control points or at least one of the one or more segments. Examples of this are described with respect to the candidate removal operation identifier 212 of FIG. 2.

Per block 809, some embodiments select the first removal operation based at least in part on the distance between the first segment and the second segment being within a threshold (e.g., being the closest in distance to each other relative to the first segment and any other segment). Examples of block 809 are described with respect to the error determiner 213 and the lossless removal operations selector 216 of FIG. 2.

Per block 811, based at least in part on the selecting, some embodiments remove at least one of, a first segment, of the one or more segments, or a first control point. Examples of such removal are described with respect to the segment removal component 214 of FIG. 2. Per block 813, based at least in part on the removing, some embodiments generate an output vector graphics image (e.g., the output image 130 of FIG. 1). In some embodiments, the output vector graphics image includes a representation of all the one or more segments or control points indicated in the input vector graphics image (e.g., the input image 102 of FIG. 1), except for at least one of, the first segment or the first control point (because they have been removed via block 811). Examples of block 811 are described with respect to the output image generator 220 of FIG. 2.

Exemplary Operating Environments

Figure 9:
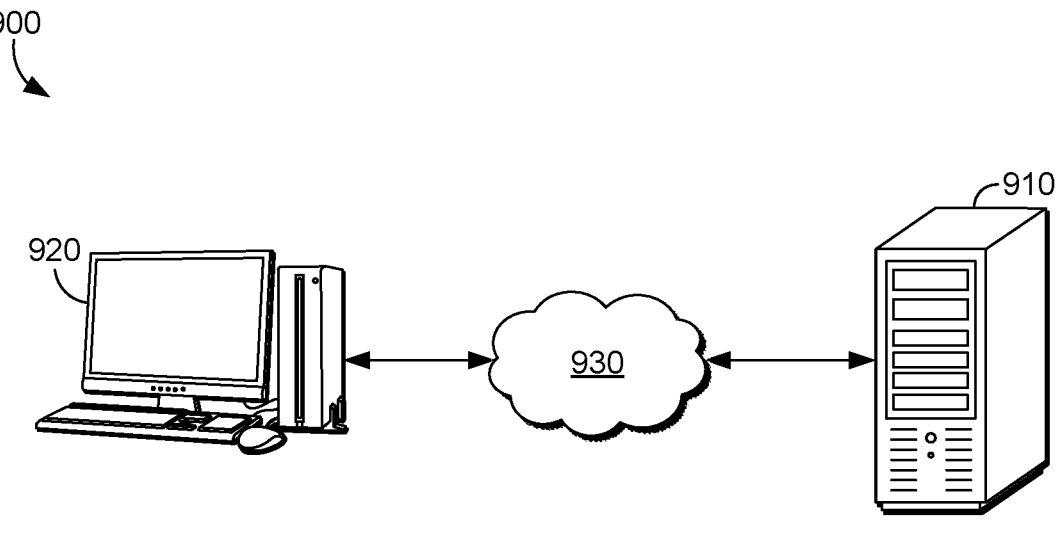
FIG. 9 is an example computer environment in which aspects of the present disclosure are employed, according to some embodiments.

Turning now to FIG. 9, a schematic depiction is provided illustrating an example computing environment 900 for recommending one or more color values for applying to an input image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 910 that represent nodes in a cloud computing network. Various functions described herein as being performed by one or more entities may be carried out by hardware, firmware, and/or software. For instance, various functions may be carried out by a processor executing instructions stored in memory.

The environment 900 depicted in FIG. 9 includes a prediction server ("server") 910 that is in communication with the network 210. The environment 900 further includes a client device ("client") 920 that is also in communication with the network 210. Among other things, the client 920 can communicate with the server 910 via the network 210, and generate for communication, to the server 910, a request to make a detection, prediction, or classification of one or more instances of a document/image. The request can include, among other things, a request to perform video object segmentation. In various embodiments, the client 920 is embodied in a computing device, which may be referred to herein as a client device or user device, such as described with respect to the computing device 10 of FIG. 10.

In some embodiments, each component FIG. 2 is included in the server 910 or the client device 920. Alternatively, in some embodiments, the components in FIG. 2 are distributed between the server 910 and client device 920.

The server 910 can receive the request communicated from the client 920, and can search for relevant data via any number of data repositories to which the server 910 can access, whether remotely or locally. A data repository can include one or more local computing devices or remote computing devices, each accessible to the server 910 directly or indirectly via network 210. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 910 is embodied in a computing device, such as described with respect to the computing device 1000 of FIG. 10.

Figure 10:
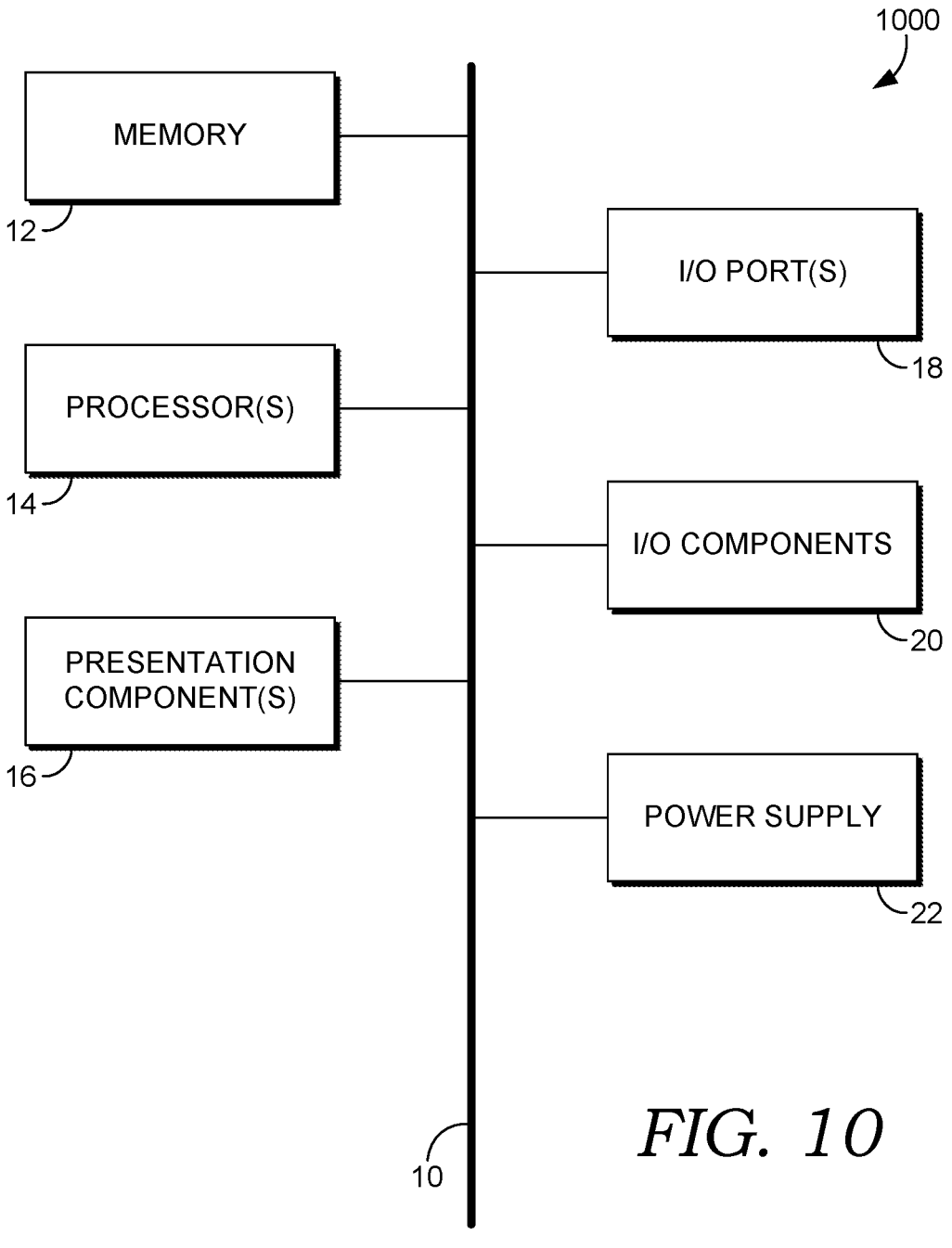
FIG. 10 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Looking now to FIG. 10, computing device 1000 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more buses (such as an address bus, data bus, or combination thereof). Although the various blocks of FIG. 10 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1000 represents the client device 920 and/or the server 910 of FIG. 9.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 700 of FIG. 7, the process 800 of FIG. 8, or any functionality described with respect to FIGS. 1 through 9.

I/O ports 18 allow computing device 1000 to be logically coupled to other devices including I/O components 20, some of which may be built in. Illustrative components include a microphone, joystick, gamepad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
at least one computer processor; and
one or more computer storage media storing computer-useable instructions that, when used by the at least one computer processor, cause the at least one computer processor to perform operations comprising:
accessing an input image, the input image being represented by two or more chains that each include one or more segments, each segment, of the one or more segments, including one or more control points that are configured to control a position of at least a respective portion of a respective segment, the input image excluding pixels;
measuring a first distance from at least a portion of a first segment, of the one or more segments, to at least a portion of a second segment, of the one or more segments, the first segment being a part of a first chain and the second segment being a part of a second chain;
based at least in part on the measuring of the first distance, determining that the first chain and the second chain have a substantially similar parametric curve by determining that a second distance between the first chain, of the two or more chains, and the second chain, of the two or more chains, is within a threshold distance;
based at least in part on the determination that the first chain and the second chain have a substantially similar parametric curve, removing at least a first control point, of the one or more control points; and
based at least in part on the removing, generating an output image.

2. The system of claim 1, wherein the determining of the first distance includes measuring a distance between a respective portion of the first segment and a corresponding portion of the second segment as an integral over a shared parametric domain, wherein the shared parametric domain is an allowable range of values for a parameter shared by the first segment and the second segment and the shared parametric domain defines the respective portion of the first segment and the corresponding respective portion of the second segment.

3. The system of claim 1, wherein the first chain has a first quantity of segments and the second chain has a second quantity of segments, wherein the determining that the second distance between the first chain and second chain is within the threshold distance is based on mapping the first chain to the second chain by selecting which portion of the first chain and the second chain will be used when the second distance is determined.

4. The system of claim 1, wherein the removal of at least the first control point is further based on ensuring that endpoints of at least one of, the first chain or the second chain is continuous after applying Gauss-Newton optimization.

5. The system of claim 1, wherein the removal of at least the first control point is indicative of removing the first segment, of the one or more segments, such that the output image includes each segment, of the one or more segments, except for the first segment.

6. The system of claim 1, wherein the removing of at least the first control point is representative of a first removal operation, and wherein the operations comprising:
placing the first removal operation in a data structure, the data structure including at least a second removal operation, and wherein the first and second removal operations are candidate operations to remove one or more control points; and
selecting the first removal operation via greedy optimization, and wherein the removal is based at least in part on the selection.

7. The system of claim 1, wherein the operations further comprising, modifying a position of at least a second control point that has not been removed based at least in part on the removal of at least the first control point.

8. The system of claim 1, wherein each segment, of the one or more segments represents a Bézier curve.

9. The system of claim 1, wherein the input image represents a vector graphics image, and wherein a vector graphics image is an image generated using a sequence of commands or mathematical statements that place at least one of: lines, curves, and shapes in two-dimensional or three-dimensional space.

10. The system of claim 1, wherein the output vector graphics image is an image generated using a sequence of commands or mathematical statements that place at least one of: lines, curves, and shapes in two-dimensional or three-dimensional space.

11. A computer-implemented method comprising:
accessing a vector graphics input image, the vector graphics input image being represented by at least one or more segments, and wherein the vector graphics image excludes any pixels;
measuring a distance from at least a portion of a first segment to at least a portion of a second segment, of the one or more segments, the first segment being a part of a first chain and the second segment being a part of a second chain;
based at least in part on the measuring of the distance, determining that the first chain and the second chain have a substantially similar parametric curve;
based at least in part on the determining that the first chain and the second chain have a substantially similar parametric curve, identifying a first removal operation and placing the first removal operation in a data structure at a storage device, wherein the data structure includes at least a second removal operation, and wherein the first removal operation and the second removal operation are candidate operations to remove at least one of, one or more control points or at least one of the one or more segments;
selecting the first removal operation based at least in part on the determining that the first chain and the second chain have a substantially similar parametric curve;
based at least in part on the selecting, removing at least one of, a first segment, of the one or more segments, or a first control point; and
based at least in part on the removing, generating an output vector graphics image, wherein the output vector graphics image includes a representation of all the one or more segments or control points of the input vector graphics image except for at least one of, the first segment or first control point.

12. The computer-implemented method of claim 11, wherein the determining of the distance includes measuring a distance between a respective portion of the first segment and a corresponding portion of the second segment as an integral over a shared parametric domain, wherein the shared parametric domain is an allowable range of values for a parameter shared by the first segment and the second segment and the shared parametric domain defines the respective portion of the first segment and the corresponding respective portion of the second segment.

13. The computer-implemented method of claim 11, wherein the removing at least one of, the first segment, of the one or more segments, or the first control point is further based on computing a chain-to-chain distance computation.

14. The computer-implemented method of claim 11, wherein the removing is further based on ensuring that endpoints of a chain is continuous after applying Gauss-Newton optimization.

15. The computer-implemented method of claim 11, wherein the removing is indicative of removing the first segment, of the one or more segments, such that the output image includes each segment, of the one or more segments, except for the first segment.

16. The computer-implemented method of claim 11, wherein the operations further comprising, modifying a position of at least a second control point that has not been removed based at least in part on the removal.

17. The computer-implemented method of claim 11, wherein each segment, of the one or more segments repre-sents a Bézier curve.

18. A system comprising:
a segment-to-segment distance means for accessing an input image, the input image being represented by two or more chains that each include one or more segments, each segment, of the one or more segments, including one or more control points that are configured to control a position of at least a respective portion of a respective segment, the input image excluding pixels;
wherein the segment-to-segment distance means is further for measuring a first distance from at least a portion of a first segment, of the one or more segments, to at least a portion of a second segment, of the one or more segments, the first segment being a part of a first chain and the second segment being a part of a second chain;
a chain-to-chain distance component for determining that the first chain and the second chain have a substantially similar parametric curve by determining that a second distance between the first chain, of the two or more chains, and the second chain, of the two or more chains, is within a threshold distance;
a segment removal means for removing at least one of, a first control point, of the one or more control points and a first segment, of the one or more segments; and
an output image generator means for generating an output image based at least in part on the removing.

19. The system of claim 18, wherein the determining of the first distance includes measuring a distance between a respective portion of the first segment and a corresponding portion of the second segment as an integral over a shared parametric domain, wherein the shared parametric domain is an allowable range of values for a parameter shared by the first segment and the second segment and the shared para-metric domain defines the respective portion of the first segment and the corresponding respective portion of the second segment.

20. The system of claim 18, wherein the removing is further based on ensuring that endpoints of at least one of, the first chain or the second chain is continuous after applying Gauss-Newton optimization.

\* \* \* \* \*